United States Patent [19]

Inoue et al.

[11] Patent Number: 4,907,409
[45] Date of Patent: Mar. 13, 1990

[54] SUPERCHARGING PRESSURE CONTROL METHOD FOR INTERNAL COMBUSTION ENGINES

[75] Inventors: Kazuo Inoue; Noriyuki Kishi; Masao Kubodera; Eitetsu Akiyama, all of Wako, Japan

[73] Assignee: Honda Giken Kogyo K.K., Tokyo, Japan

[21] Appl. No.: 290,432

[22] Filed: Dec. 27, 1988

[30] Foreign Application Priority Data

Dec. 29, 1987 [JP] Japan .............................. 62-334196
Apr. 19, 1988 [JP] Japan ................................ 63-97600

[51] Int. Cl.⁴ ............................................ F02B 37/12
[52] U.S. Cl. ..................................................... 60/602
[58] Field of Search ................ 60/600, 601, 602, 603, 60/611; 123/564

[56] References Cited

U.S. PATENT DOCUMENTS 4,679,398  7/1987  Nishiguchi et al. .................. 60/602
4,697,422 10/1987  Ueno et al. ............................ 60/602
4,709,553 12/1987  Ueno et al. ............................ 60/602
4,769,994  9/1988  Hirabayashi .......................... 60/602

FOREIGN PATENT DOCUMENTS 123718  6/1986  Japan ..................................... 60/602

Primary Examiner—Michael Koczo
Attorney, Agent, or Firm—Arthur L. Lessler

[57] ABSTRACT

A method of controlling supercharging pressure in an internal combustion engine having a supercharger with an increase rate-varying device for varying the rate of increase of the supercharging pressure. The supercharging pressure is controlled to a desired value in response to the difference between the actual value of the supercharging pressure and the desired value. The increase rate-varying device is held in a position for obtaining the maximum rate of increase of the supercharging pressure while the actual value of the supercharging pressure is below a predetermined value which is lower than the desired value. The predetermined value is set to a lower value as the rate of increase of the supercharging pressure increases, or when a transmission of the engine is in a lower of two or more speed positions of the transmission. Also, the predetermined value of the supercharging pressure is set to a lower value as the actual intake air temperature decreases.

5 Claims, 27 Drawing Sheets

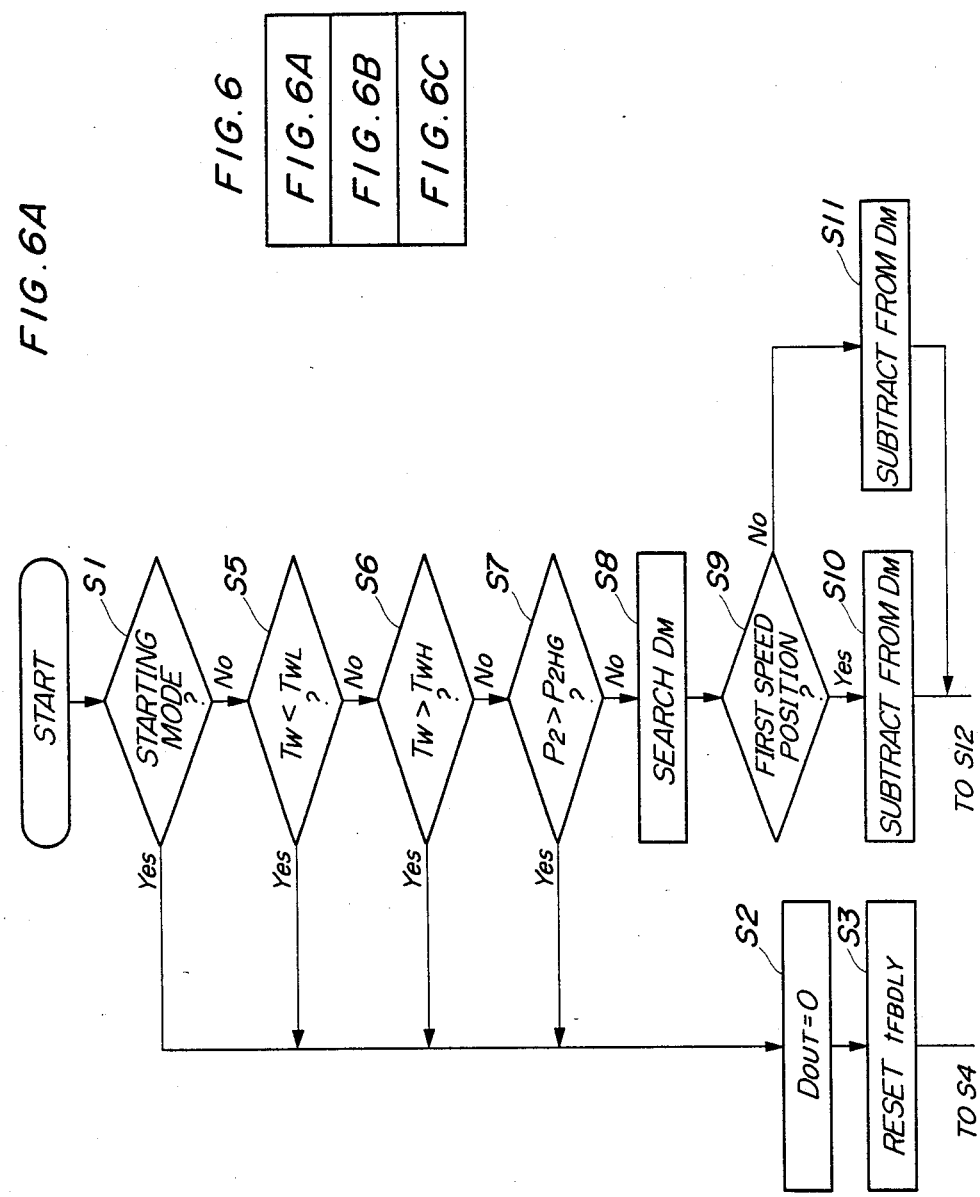

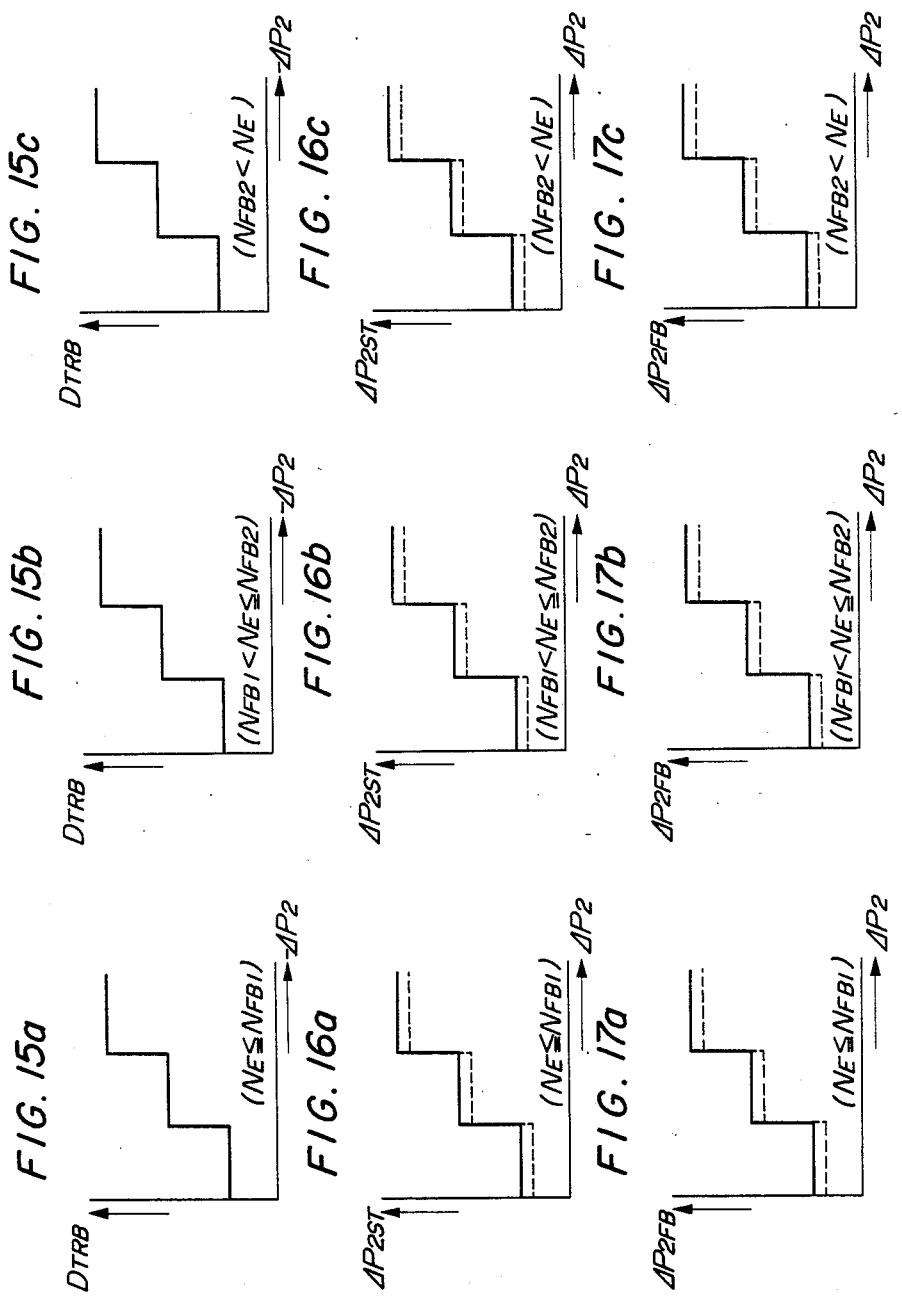

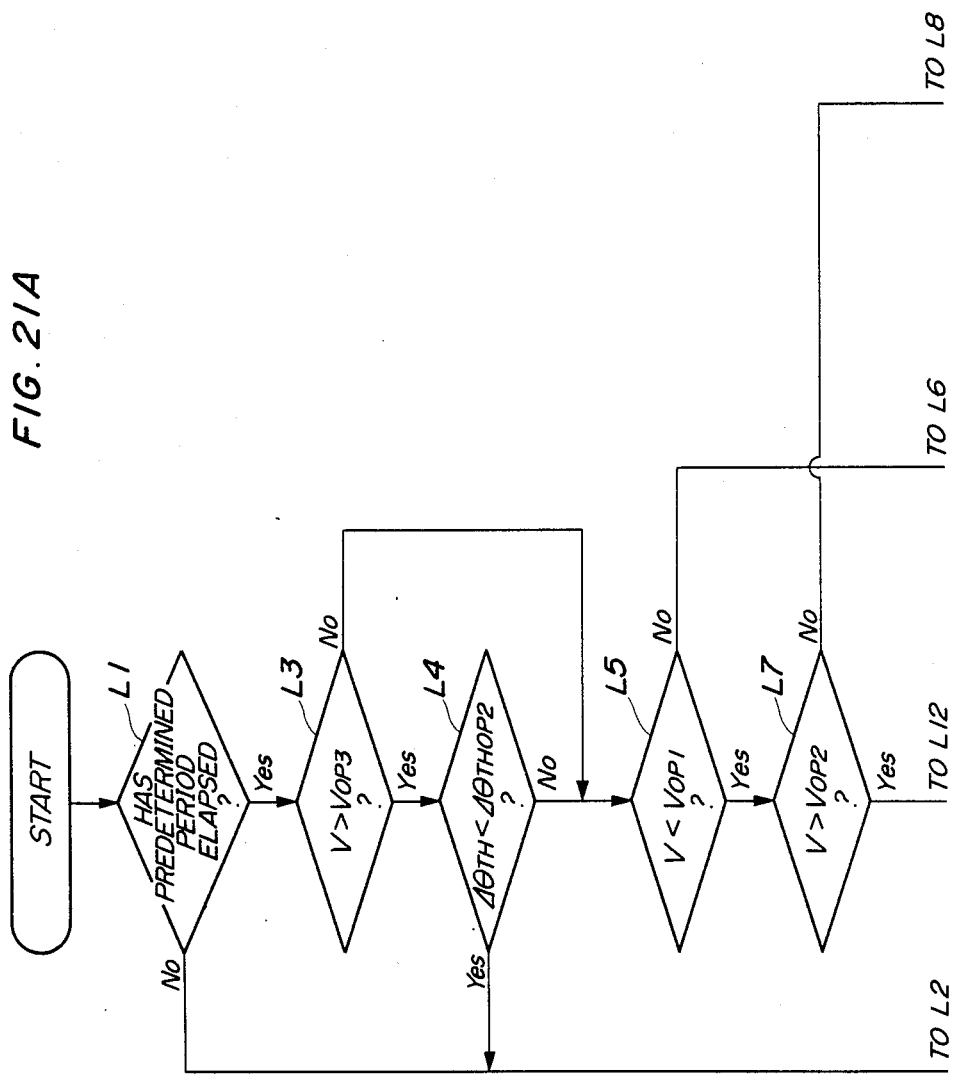

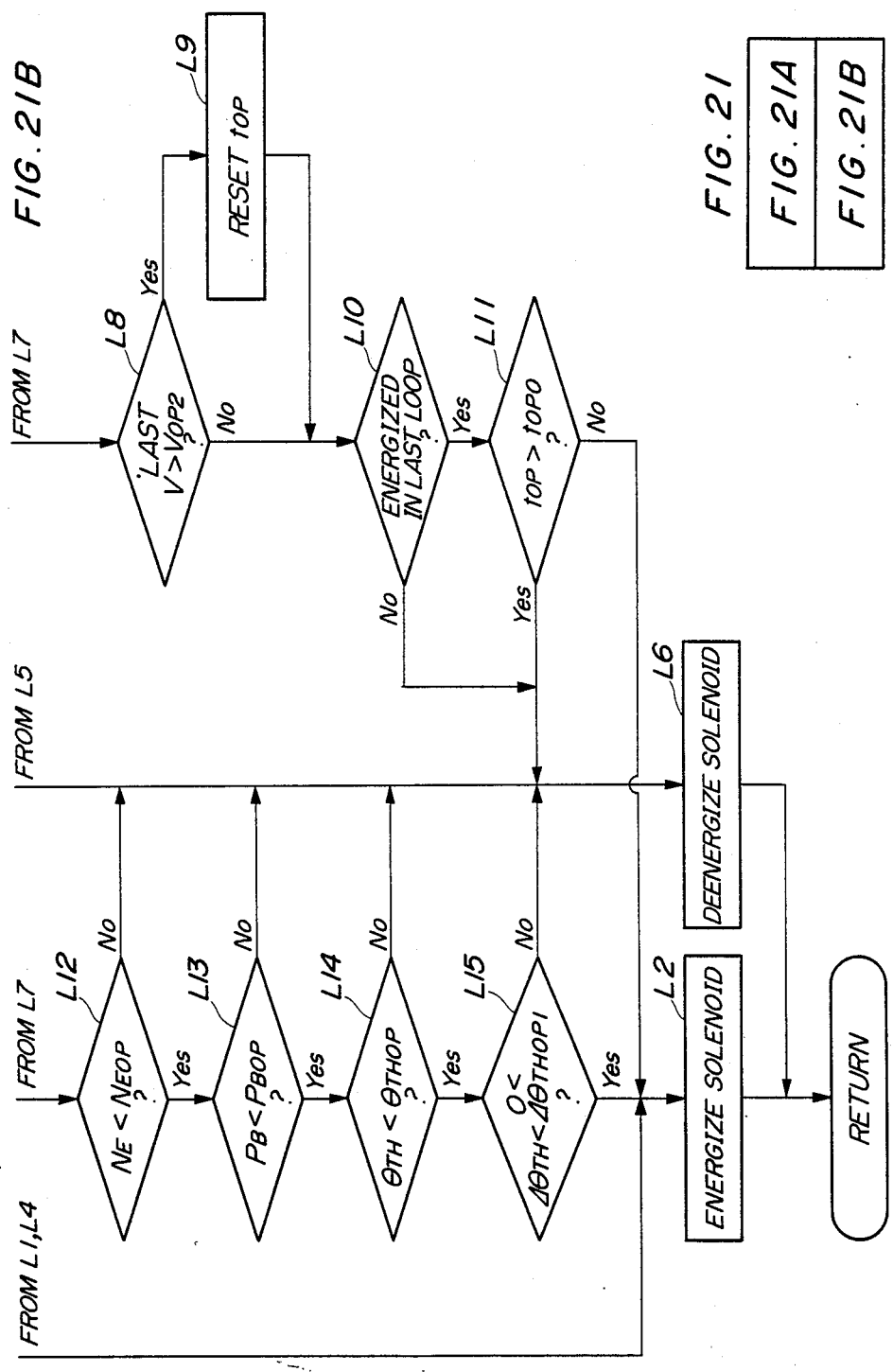

| FIG. 22A |
|----------|
| FIG. 22B |

FIG. 32

| NE\TA | TAV1 ---- TAVj ----- TAV8 |
|---|---|
| Nv1 | PBREF1,1 |
| Nvi | ------ PBREFi,j |
| Nv20 | PBREF20,8 |

FIG. 35

| NE\TA | TAV1 --- TAVj ------ TAV8 |
|---|---|
| Nv1 | KMOD1,1 |
| Nvi | ------ KMODi,j |
| Nv20 | ---------- KMOD20,8 |

SUPERCHARGING PRESSURE CONTROL METHOD FOR INTERNAL COMBUSTION ENGINES

BACKGROUND OF THE INVENTION

This invention relates to a method of controlling supercharging pressure in an internal combustion engine equipped with a supercharger, and more particularly to an improved method of properly controlling the supercharging pressure at acceleration of the engine.

A supercharging pressure control method for internal combustion engines has conventionally been known, e.g. from Japanese Provisional Patent Publication (Kokai) No. 61-175,239, in which a supercharging pressure control system selectively controls a control valve between (i) a first position in which the cross-sectional area of a passage for exhaust gases for rotating a turbine of the supercharger is increased to make the supercharging pressure higher, and (ii) a second position in which the cross-sectional area of the passage is reduced to make the supercharging pressure lower, in dependence on operating conditions of the engine. At acceleration of the engine, the control valve is brought into and held in the first position for a predetermined period of time after acceleration of the engine has been detected, to thereby enhance the responsiveness of the engine.

However, according to the conventional control method, good accelerability of the engine may not be obtained, depending upon the behavior of the supercharging pressure. Specifically, according to the method, acceleration of the engine is detected based upon the amount of intake air and the rate of change of the opening of a throttle valve of the engine, in such a manner that the engine is deemed to be in a condition of acceleration if both the amount of intake air and the throttle valve change rate are higher than respective predetermined values. When the engine is thus determined to be in a condition of acceleration, the control valve is brought into the first position so as to obtain the maximum supercharging effect. However, as shown by the broken line in FIG. 1, when the driver steps on the accelerator pedal in order to accelerate the engine, for example, the opening $\theta$th of the throttle valve mechanically connected to the accelerator pedal increases immediately, as at time point t1 in the figure; whereas the amount of intake air increases due to the supercharging effect, but with some time lag. Therefore, the acceleration is detected with delay as at time point t2. This results in a delay in the rise of the supercharging pressure $P_{BATC}$ and hence degraded accelerability.

Since the predetermined period of time over which the control valve is held in the first position is set in dependence on the rotational speed of the engine as well as the rate of change of the throttle valve opening, it is impossible to effect the supercharging pressure control in response to the actual rate of rise of the supercharging pressure. For example, when the rate of rise is high, overboost of the supercharging pressure can occur, as at the period between time points t3-t4; whereas when the rate of rise is low, the predetermined period of time elapses so that the control valve is brought out of the first position before the supercharging pressure rises to a sufficient level, as at time point t5, resulting in poor responsiveness at the acceleration of the engine.

SUMMARY OF THE INVENTION

It is the object of the invention to provide a supercharging pressure control method for internal combustion engines, which is capable of controlling the supercharging pressure so as to increase the rate of rise thereof without causing overboost, to thereby enhance the accelerability of the engine.

To attain the above object, the present invention provides a method of controlling supercharging pressure in an internal combustion engine having a supercharger having increase rate-varying means for varying the rate of increase of the supercharging pressure, wherein the supercharging pressure is controlled to the desired value in response to a difference between an actual value of the supercharging pressure and the desired value.

The method according to the invention comprises the following steps:

(1) detecting the actual value of the supercharging pressure;

(2) comparing the detected actual value of the supercharging pressure with a predetermined value which is lower than the desired value; and (3) holding the increase rate-varying means in a position for obtaining the maximum rate of increase of the supercharging pressure while the detected actual value of the supercharging pressure is lower than the predetermined value.

Preferably, the actual rate of increase rate of the supercharging pressure is detected, and the predetermined value of the supercharging pressure is decreased as the detected rate of increase of the supercharging pressure increases.

The predetermined value of the supercharging pressure is preferably set to a lower value when a transmission of the engine is in a lower speed position than when the transmission is in a higher speed position.

Preferably actual value of temperature of intake air supplied to the engine is detected, and the predetermined value of the supercharging pressure is reduced when the detected actual value of temperature of intake air is lower than a predetermined value.

In a preferred embodiment of the invention, the method according to the invention is applied to a supercharger of the type wherein movable vanes which serve as the increase rate-varying means are arranged at an inlet opening of said turbine wheel and are displaceable to vary the area of the inlet opening. The movable vanes are held in a position for obtaining the maximum area of the inlet opening so long as the detected actual value of the supercharging pressure is lower than the predetermined value.

The above and other objects, features, and advantages of the invention will be more apparent from the ensuing detailed description taken in conjunction with the accompanying drawings.

BRIEF DESCRIPTION OF THE DRAWINGS

FIG. 6, a composite figure comprising FIGS. 6A, 6B and 6C, is a flowchart showing a main routine for controlling an electromagnetic control valve which appears in FIG. 2, according to a first embodiment of the invention;

FIGS. 15(a), 15(b) and 15(c), collectively referred to hereafter as FIG. 15, constitute diagrams showing maps of $D_{TRB}$;

FIGS. 16(a), 16(b) and 16(c), collectively referred to hereafter as FIG. 16, constitute diagrams similar to those of FIG. 15, showing maps of a decremental valve $\Delta P_{2ST}$;

FIGS. 17(a), 17(b) and 17(c), collectively referred to hereafter as FIG. 17, constitute diagrams similar to those of FIG. 15, showing maps of a decremental valve $\Delta P_{2FB}$;

FIG. 21, a composite figure comprising FIGS. 21A and 21B, is a flowchart showing a main routine for controlling an electromagnetic valve which appears in FIG. 2;

FIGS. 27A and 27B, is a flowchart showing a subroutine for determining an open loop control region, which is executed at a step S106 in FIG. 22;

FIG. 32 is a diagram showing a map of a desired value $P_{BREF}$ of supercharging pressure;

FIG. 35 is a diagram showing a map of a learned correction coefficient $K_{MOD}$.

DETAILED DESCRIPTION

The invention will now be described in detail with reference to the drawings showing embodiments thereof.

Figure 2:
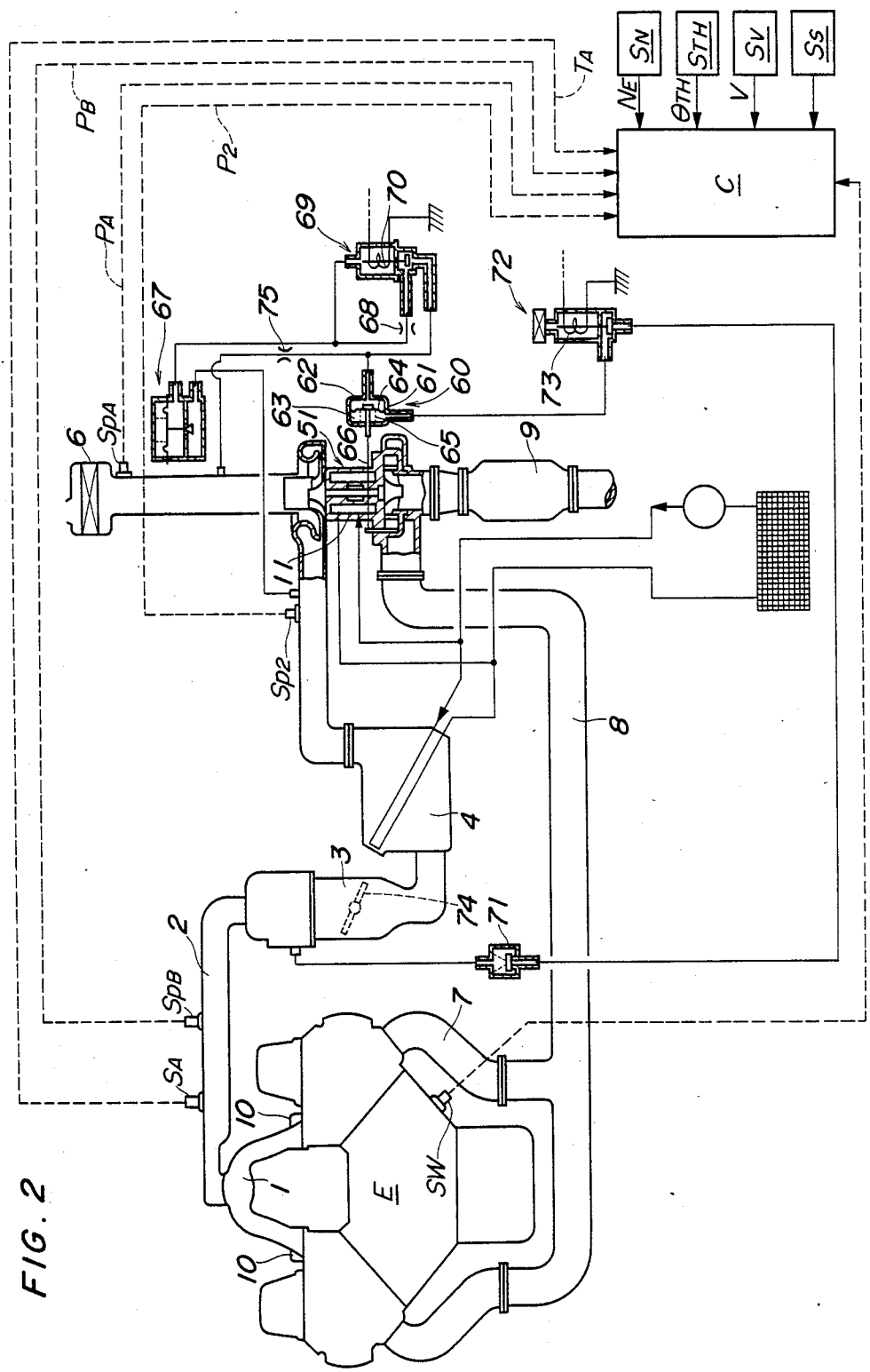
FIG. 2 is a schematic view showing the whole arrangement of the intake system and the exhaust system of an internal combustion engine to which is applied the method according to the invention.
Figure 3:
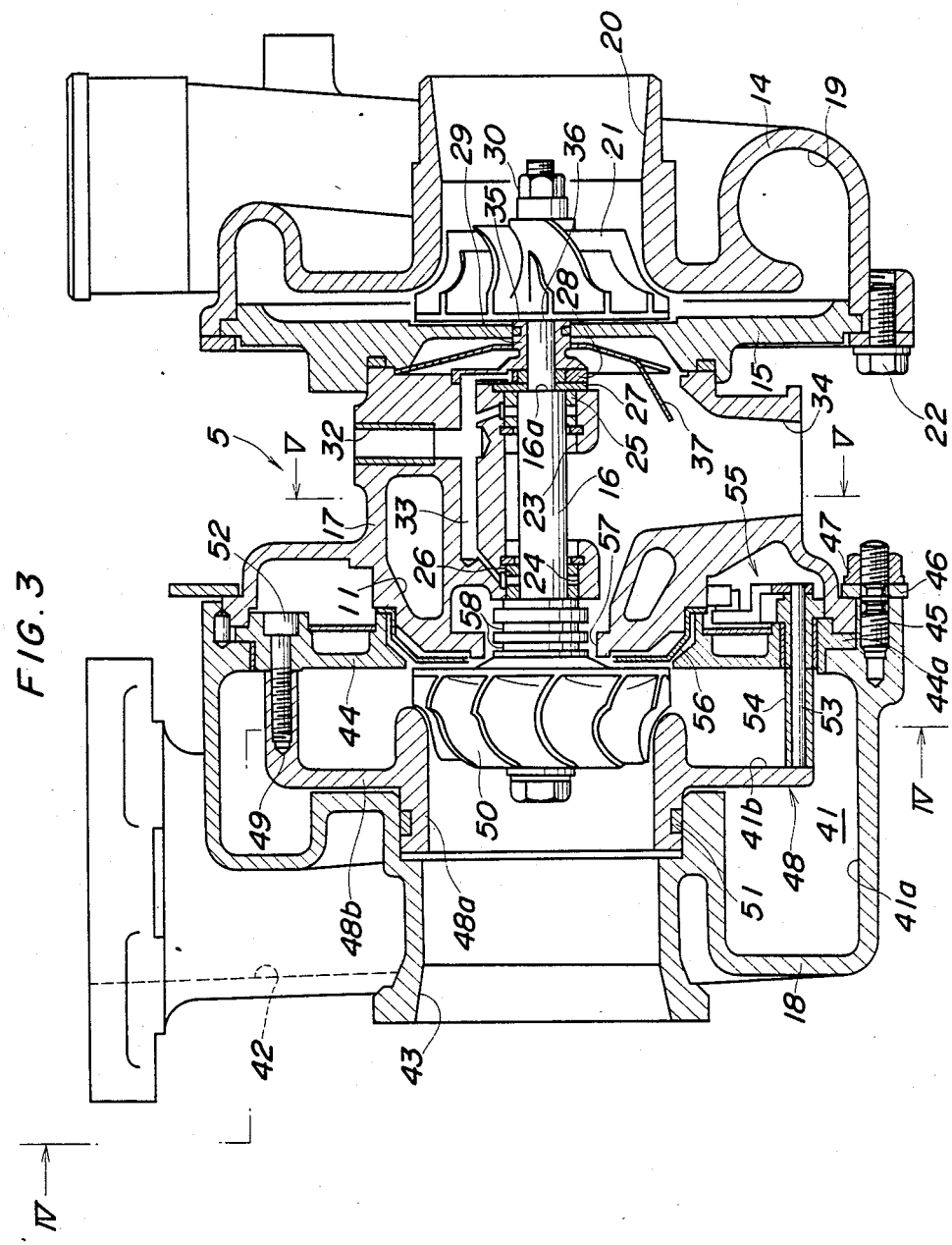
FIG. 3 is an enlarged longitudinal cross-sectional view of a variable capacity turbocharger which appears in FIG. 2.
Figure 4:
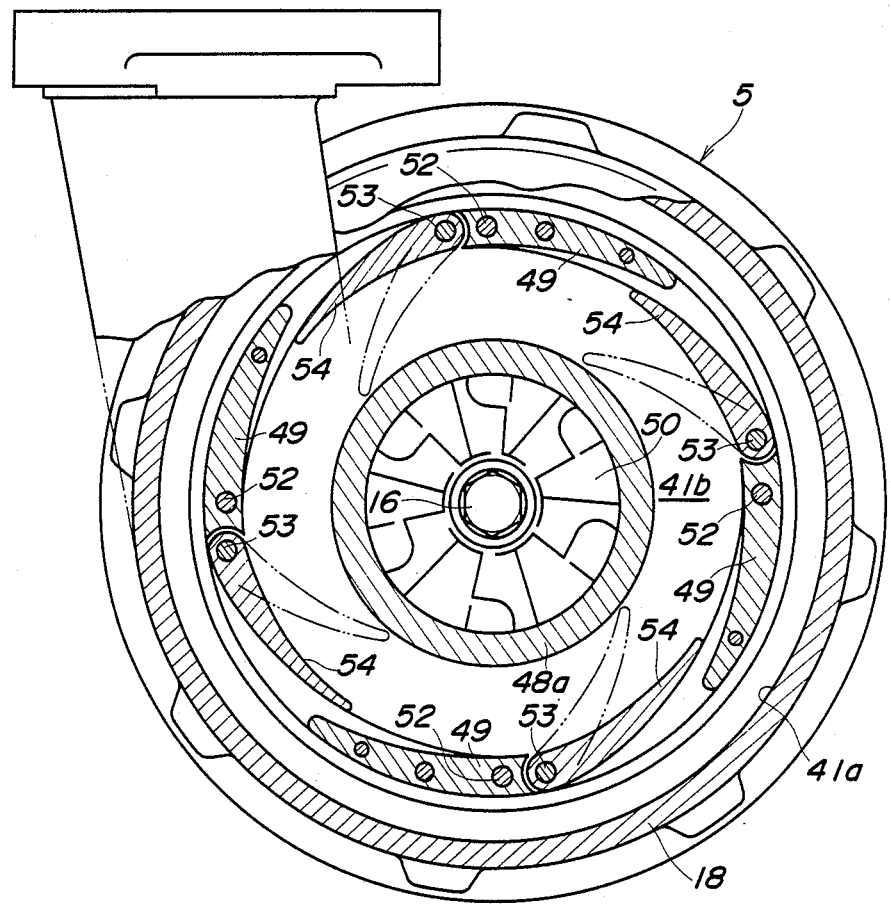
FIG. 4 is a transverse cross-sectional view taken on line IV—IV of FIG. 3.

Referring first to FIGS. 2 through 4, there is illustrated a supercharging pressure control system for an internal combustion engine, to which is applied the method according to the invention. The engine is a multiple-cylinder type which has a cylinder block E with a plurality of cylinders each provided with an intake port, neither of which is shown. Connected to the intake port of each cylinder is an intake manifold 1, to which are connected an intake pipe 2, a throttle body 3, an intercooler 4, a variable capacity type turbocharger 5, and an air cleaner 6 in the order mentioned. Each cylinder has an exhaust port, not shown, to which is connected an exhaust manifold 7. Connected to the exhaust manifold 7 is an exhaust pipe 8 with the turbocharger 5 arranged across an intermediate portion thereof. A three-way catalytic converter 9 is arranged across the exhaust port at a location downstream of the turbocharger 5. Fuel injection valves 10 are mounted in the intake manifold 1 at locations close to the intake ports of the respective cylinders for injecting fuel toward the intake ports.

The turbocharger 5 is provided with a water jacket 11, an inlet of which is connected in parallel with an outlet of a water pump 13, together with an inlet of the intercooler 4. The water jacket 11 and the intercooler 4 have their outlets connected to the radiator 12. The radiator 12 is provided in addition to a radiator, not shown, for cooling coolant supplied to the interior of the cylinder block E of the engine.

Figure 5:
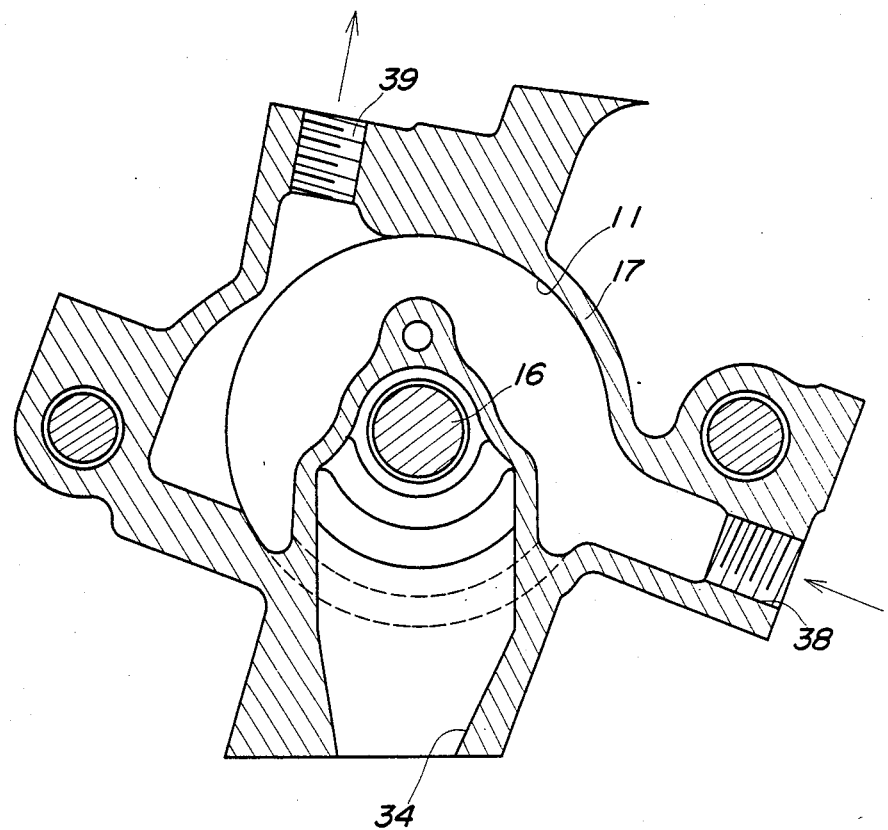
FIG. 5 is a transverse cross-sectional view take on line V—V of FIG. 3.

The structure of the variable capacity type turbocharger 5 will now be explained with reference to FIGS. 3-5. The turbocharger 5 comprises a compressor casing 14, a back plate 15 closing a rear side of the compressor casing 14, a main shaft 16, a bearing casing 17 supporting the main shaft 16, and a turbine casing 18.

A scroll passage 19 is defined between the compressor casing 14 and the back plate 15, and an axially extending inlet passage 20 is defined through a central portion of the compressor casing 14. A compressor wheel 21 is mounted on an end of the main shaft 16 at a central portion of the scroll passage 19 and at an inner end of the inlet passage 20.

The compressor casing 14 and the back plate 15 are fastened together by means of bolts 22. The bearing casing 17 is joined to the back plate 15 at a central portion thereof. The bearing casing 17 is formed therein with a pair of bearing holes 23, 24 in coaxial and spaced relation to each other, through which the main shaft 16 extends. Interposed between the main shaft 16 and the bearing holes 23, 24 are radial bearings 25, 26 rotatably supporting the main shaft 16 against the bearing casing 17. Interposed between a stepped shoulder 16a of the main shaft 16 facing toward the compressor wheel 21 and the compressor wheel 21 are a collar 27, a thrust bearing 28, and a bushing 29 in the order mentioned as viewed from the side having stepped shoulder 16a. By fastening a nut 30 threadedly fitted on an end portion of the main shaft 16 against an outer end of the compressor wheel 21, the main shaft 16 is located in its proper axial position and at the same time the compressor wheel 21 is mounted onto the main shaft 16.

A lubricating oil inlet port 32 is formed in a lateral side wall of the bearing casing 17 and connected to a lubricating oil pump, not shown, and a lubricating oil passage 33 is formed in the bearing casing 17 for guiding lubricating oil from the lubricating oil inlet port 32 to the radial bearings 25, 26 as well as to the thrust bearing 28. The bearing casing 17 has the other lateral side wall formed with a lubricating oil drain port 34 for draining lubricating oil. The drained oil is collected into an oil sump, not shown.

The bushing 29 extends through a through hole 35 formed in a central portion of the back plate 15. A seal ring 36 is interposed between the bushing 29 and the through hole 35 to prevent lubricating oil from flowing from the thrust bearing 28 to the compressor wheel 21. A guide plate 37 is interposed between the back plate 15 and the thrust bearing 28, through which the bushing 29 extends, so that lubricating oil flowing from the thrust bearing 28 is guided by the guide plate 37 while it is splashed in the radially outward direction. A free end portion of the guide plate 37 is curved so as to smoothly guide the lubricating oil into the lubricating oil drain port 34.

The bearing casing 17 is further formed therein with the aforementioned water jacket 11 disposed around the main shaft 16, a water supply port 38 for guiding water or coolant from the water pump 13 shown in FIG. 2 to the water jacket 11, and a water drain port 39 for guiding water from the water jacket 11 to the radiator 12 shown in FIG. 2. The water jacket 11 has a portion closer to the turbine casing 18 which is shaped in the form of an annulus surrounding the main shaft 16, and a portion above the lubricating oil drain port 34 and the main shaft 16, which has a generally U-shaped section in a manner downwardly diverging along the main shaft 16 as shown in FIG. 5. The water supply port 38 communicates with a lower portion of the water jacket 11, while the water drain port 39 communicates with an upper portion of the water jacket 11.

The turbine casing 18 is formed therein with a scroll passage 41, an inlet passage 42 tangentially extending from the scroll passage 41, and an outlet passage 43 axially extending from the scroll passage 41.

The bearing casing 17 and the turbine casing 18 are joined together with a back plate 44 held therebetween. That is, the two members are fastened together by tightening nuts 47 via rings 46 onto respective stud bolts 45 screwed in the turbine casing 18, with a radial flange 44a at the periphery of the back plate clamped between the two members.

Secured to the back plate 44 is a stationary vane member 48 which divides the interior of the scroll passage 41 into a radially outer passage 41a, and a radially inner or inlet passage 41b. The stationary vane member 48 comprises a cylindrical hub portion 48a coaxially fitted in the outlet passage 43 via a seal ring 51, an annular radial portion 48b radially outwardly extending from an axially intermediate portion of the cylindrical hub portion 48a, a plurality of, e.g. four stationary vanes 49 axially extending from an outer peripheral edge of the annular radial portion 48b and secured to the back plate 44 by means of bolts 52. A turbine wheel 50 is accommodated within the stationary vane member 48, which is secured on the other end of the main shaft 16.

The stationary vanes 49 are circumferentially arranged at equal intervals, each being arcuate in shape. Disposed between adjacent stationary vanes 49 are movable vanes 54 with one end of each movable vane secured to a corresponding one of the rotatary shafts 53. The rotary shafts 53 are rotatably supported by the back plate 44 with their axes extending parallel with that of the main shaft 16. The movable vanes 54 act to adjust the opening area of spaces (hereinafter called "the space area") between adjacent stationary and movable vanes 49, 54.

Each movable vane 54 is also arcuate in shape, with almost the same curvature as the stationary vanes 49, and is pivotable between a fully closed position shown by the solid line in FIG. 4 and a fully open position shown by said broken line in the figure. The rotary shafts 53 are operatively connected to an actuator 60 in FIG. 2 by means of a link mechanism 55 disposed between the back plate 44 and the bearing casing 17, so that the movable vanes 54 are simultaneously controlled to open and close by the actuator 60.

Interposed between the back plate 44 and the bearing casing 17 is a shield plate 56 extending along a rear end face of the turbine wheel 50, for preventing the heat of exhaust gases from the engine flowing in the inlet passage 41b from being directly transmitted to the interior of the bearing casing 17. A plurality of annular grooves 58 are formed as labyrinth grooves in the outer peripheral surface of the main shaft 6 at a location corresponding to a through hole 57 formed in the bearing casing 17 and penetrated by an end of the main shaft 16. These grooves 58 serve to prevent exhaust gas from leaking into the bearing casing 17.

With the above described arrangement, exhaust gases emitted from the engine cylinder block E flow into the radially outer passage 41a through the inlet passage 42, and then flow into the inlet passage 41b at a flow rate corresponding to the space area between the movable vanes 54 and the stationary vanes 49, which area is determined by the angle of the movable vanes 54. As the exhaust gases flow into the inlet passage 41b, they cause the turbine wheel 50 to rotate. Then, the gases are discharged through the outlet passage 43. As the space area between the movable and stationary vanes 54, 49 decreases, the rotational speed of the turbine wheel 50 and hence that of the main shaft 16 increases whereas as the opening area increases, the rotational speed decreases. The rotation of the turbine wheel 50 causes rotation of the compressor wheel 21 so that air introduced into the inlet passage 20 through the air cleaner 6 is compressed by the rotating compressor wheel 21 to be forced to pass through the scroll passage 19 toward the intercooler 4. When the movable vanes 54 are moved into the radially outermost position so that the space area between the movable and stationary vanes 54, 49 becomes a minimum, the supercharging pressure becomes a maximum; whereas when the movable vanes 54 assume the radially innermost position and hence the opening area becomes a maximum, the supercharging pressure becomes a minimum.

Water supplied into the water jacket 11 serves to prevent the temperature of the bearing casing 17 from becoming excessively high due to increased temperature of air compressed by the turbocharger 5; while water supplied to the intercooler 4 serves to prevent increase of the intake air temperature.

Referring again to FIG. 2, the actuator 60, which drives the movable vanes 54 of the turbocharger 5, comprises a housing 61, a diaphragm dividing the interior of the housing 61 into a first pressure chamber 62 and a second pressure chamber 63, a return spring 65 interposed between the housing and the diaphragm 64 and urging the diaphragm 64 in a direction causing the first pressure chamber 62 to contract, and a driving rod 66 movable extending through the housing 61 in an airtight manner with one end thereof connected to the diaphragm 64 and the other end to the link mechanism 55. The driving rod 66 and the link mechanism 55 are connected to each other in such a way that when the driving rod 66 is moved by the diaphragm 64 which is displaced in a direction causing the second pressure chamber 63 to contract, the movable vanes 54 are radially inwardly pivoted in the turbine casing 18 to increase the space opening area between the movable and stationary vanes 54, 49.

The first pressure chamber 62 is connected to a portion of the intake passage between the turbocharger 5 and the intercooler 4 via a regulator 67, a restriction 68, and an electromagnetic control valve 69, to be supplied with supercharging pressure $P_2$ therefrom; and is also connected to another portion of the intake passage between the air cleaner 6 and the turbocharger 5. The electromagnetic control valve 69 is a normally-closed duty ratio control type with a solenoid 70. As the valve-closing duty ratio for the solenoid 70 becomes smaller, the pressure within the first pressure chamber 62 increases, which increase is transmitted through the driving rod 66 and the link mechanism 55 to cause the movable vanes 54 to be radially inwardly pivoted, i.e. toward the closing side. The second pressure chamber 63 is connected to a portion of the intake passage downstream of the throttle body 3 through a check valve 71 and an electromagnetic valve 72 to be supplied with intake pressure $P_B$ therefrom. The electromagnetic valve 72 is a normally-closed type which becomes open when its solenoid 73 is energized. When the valve 72 is open, intake pressure $P_B$ is supplied into the second pressure chamber 63 so that the actuator 60 drives the movable vanes 54 to be radially inwardly displaced.

The electromagnetic valves 69, 72 are controlled by an electronic control unit (control means) C, to which are connected a water temperature sensor $S_W$ for sensing the temperature $T_W$ of cooling water in a water jacket (not shown) provided in the engine cylinder block E, an intake air temperature sensor $S_A$ for sensing the temperature $T_A$ of intake air in the intake passage downstream of the intercooler 4, an intake pressure sensor $S_{PA}$ for sensing intake pressure $P_A$ in the intake passage at a location between the air cleaner 6 and the turbocharger 5, a supercharging pressure sensor $S_{P2}$ for sensing supercharging pressure $P_2$ in the intake passage at a location between the turbocharger 5 and the intercooler 4, an intake pressure sensor $S_{PB}$ for sensing intake pressure $P_B$ in the intake passage downstream of the throttle body 3, an engine speed sensor $S_N$ for sensing the rotational speed $N_E$ of the engine, a throttle valve opening sensor $S_{TH}$ for sensing the valve opening $\theta_{TH}$ of a throttle valve 74 within the throttle body 3, a vehicle speed sensor $S_V$ for sensing the speed V of a vehicle in which the engine is installed, and a gear position sensor $S_S$ for sensing the gear position of an automatic transmission connected to the engine. The control unit C operates in response to the input signals from these sensors to control the energization and deenergization of the solenoids 70, 73 of the electromagnetic valves 69, 72.

Next, the manner of control by the control unit C will be described below. First, the control of duty ratio of the solenoid 70 of the electromagnetic control valve 69 will be described with reference to a main routine shown in FIG. 6. The valve-closing duty ratio $D_{OUT}$ represents the ratio of valve-closing time to the time period of one cycle over which the valve 69 is opened and closed. Therefore, as the duty ratio $D_{OUT}$ is larger, the amount of opening of the movable vanes 54 is decreased, and $D_{OUT}=0\%$ corresponds to the maximum amount of opening of the movable vanes 54 while $D_{OUT}=100\%$ corresponds to the minimum opening amount thereof.

At step S1, it is determined whether or not the engine is in starting mode, i.e. whether the engine is cranking. If the engine is in starting mode, the duty ratio $D_{OUT}$ is set to 0, i.e. the electromagnetic control valve 69 is fully opened to provide the maximum space area between the movable vanes 54 and the stationary vanes 49 (step S2). The engine is unstable during cranking, and if supercharging pressure is introduced into combustion chambers while the engine is in such an unstable state, the engine will be more unstable. Therefore, in the above step S2, the space area between the movable vanes 54 and the stationary vanes 49 is made a maximum to thereby prevent supercharging pressure from being introduced into the combustion chambers. Further, supercharging of intake air is not required during cranking, and therefore it is not necessary to reduce the space area between the movable vanes 54 and the stationary vanes 49. At step S3, a $t_{FBDLY}$ timer for counting a time period $t_{FBDLY}$ by which the start of the feedback control is delayed is; and then at step S4, the duty ratio output signal $D_{OUT}$ is provided.

Figure 6B:
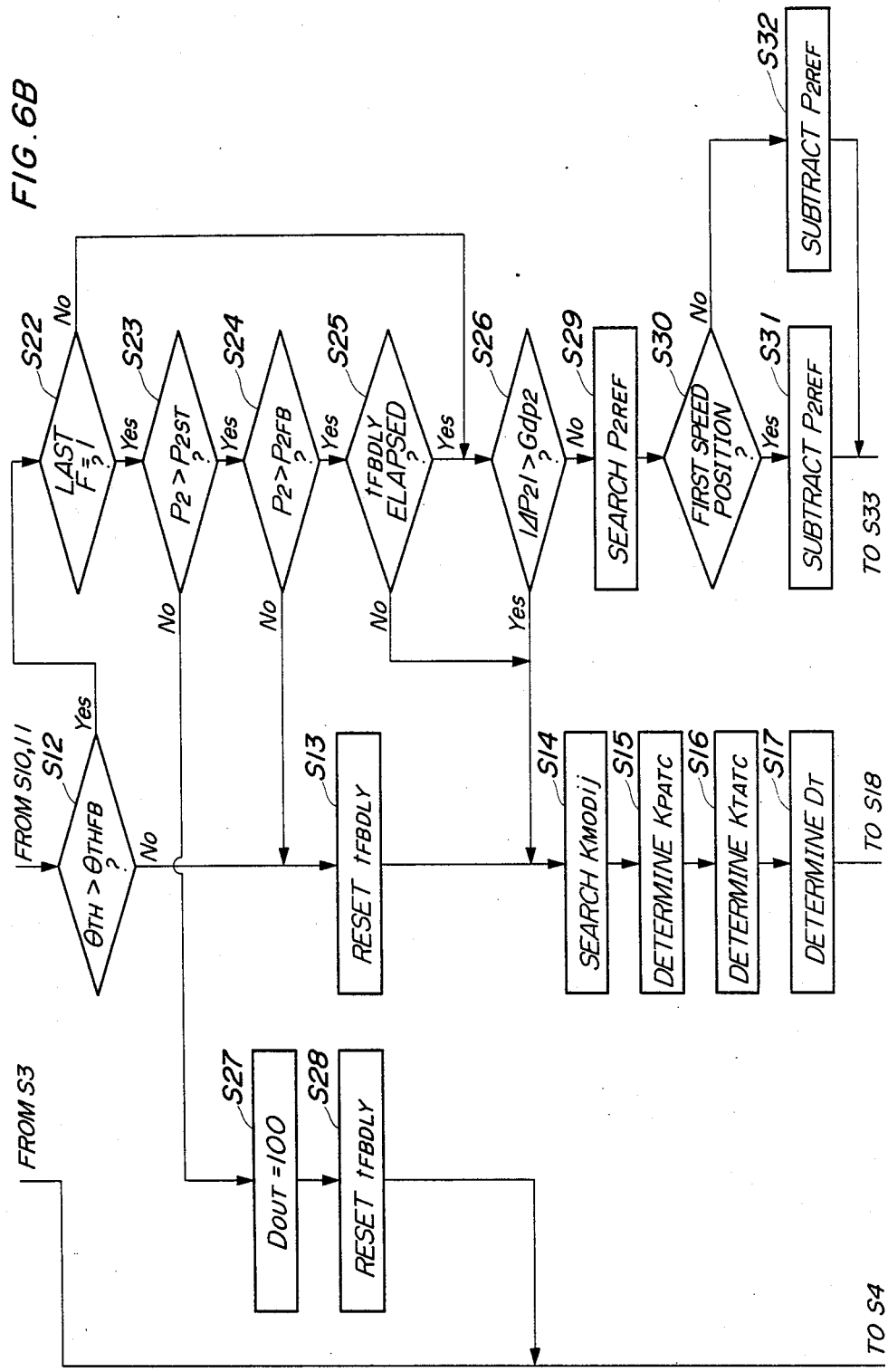
Figure 6C:
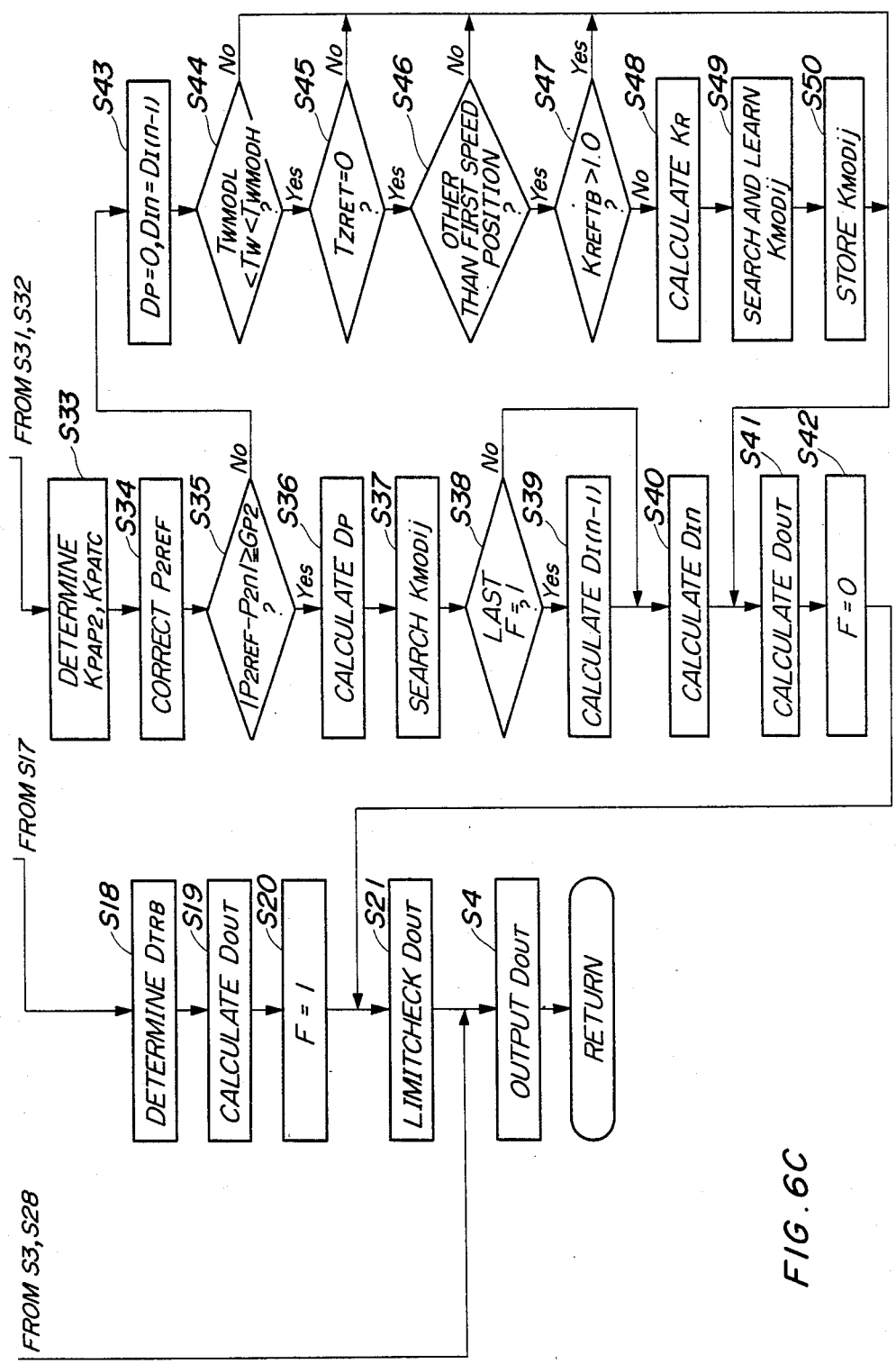
Figure 7:
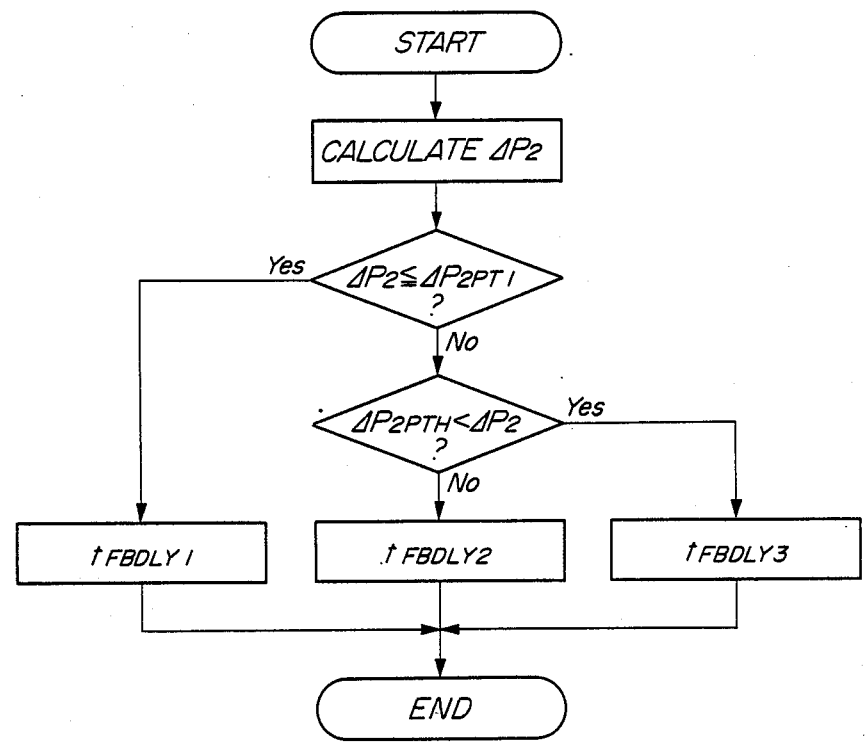
FIG. 7 is a flowchart showing a subroutine for selecting a time period to be counted by a timer.

The time period $t_{FBDLY}$ is calculated in manner shown in FIG. 7. Depending on the change rate $\Delta P_2$ in supercharging pressure $P_2$ [i.e. the pressure change over a predetermined interval, which corresponds to a rate of change of pressure since the interval is fixed], one of three time periods $t_{FBDLY1}$, $t_{FBDLY2}$, and $t_{FBDLY3}$ is selected as $t_{FBDLY}$. The change rate $\Delta P_2$ is calculated as the difference ($\Delta P_2 = P_{2n} - P_{2n-6}$) between the supercharging pressure $P_{2n}$ detected in the present loop and the supercharging pressure $P_{2n-6}$ detected in the sixth loop before the present loop. More specifically, the main routine shown in FIG. 6 is carried out in synchronism with generation of TDC signal pulses. However, since the change rate $\Delta P_2$ in supercharging pressure $P_2$ between two adjacent TDC signal pulses is too small for accurate detection the difference between the pressure value $P_{2n}$ detected in the present loop and the pressure value $P_{2n-6}$ detected in the sixth loop before the present loop is calculated in order to detect the supercharging characteristic or the change rate $\Delta P_2$ more accurately. A predetermined lower change rate $\Delta P_{2PTL}$ and a predetermined higher change rate $\Delta P_{2PTH}$ are provided which are determined in accordance with the engine rotational speed $N_E$. If $\Delta P_2 \leq \Delta P_{2PTL}$, $t_{FBDLY1}$ is selected, if $\Delta P_{2PTL} < \Delta P_2 \leq \Delta P_{2PTH}$, $t_{FBDLY2}$ is selected, and if $\Delta P_{2PTH} < \Delta P_2$, $t_{FBDLY3}$ is selected. Further, the three time periods are in the relationship of $t_{FBDLY1} < t_{FBDLY2} < t_{FBDLY3}$. Therefore, when the change rate $\Delta P_2$ is small, i.e. the supercharging pressure undergoes a gentle change, the delaying time is set to a smaller value, and when the change rate $\Delta P_2$ is great, i.e. the supercharging pressure undergoes a drastic change, the delaying time is set to a larger value. This makes it possible to set the delaying time period $t_{FBDLY}$ to an appropriate value when the operating mode is shifting from open loop mode to feedback control mode, to thereby positively prevent occurrence of hunting of the supercharging pressure during the transitional state of the operating mode.

If it is determined at the step S1 that the engine is not in its starting mode, it is determined at step S5 whether or not the engine coolant temperature $T_W$ is below a predetermined lower value $T_{WL}$. If the engine coolant temperature $T_W$ is below the predetermined lower value $T_{WL}$, the program proceeds to step S2. The possible operating conditions of the engine which satisfy $T_W < T_{WL}$ are, for example, those in which the engine is at an early stage of starting or the ambient air temperature is very low. At the early stage of starting, the operation of the engine is unstable, while when the ambient air temperature is very low, the intake air density is high to increase the charging efficiency; which may result in abnormal combustion of the engine. If supercharging pressure is introduced into the combustion chambers under such a cold state of the engine, the operation of the engine may be even more unstable, and abnormal combustion may be promoted. Further, at an extremely low temperature, there is a possibility of malfunctioning of the electromagnetic valve 69; that is, the electromagnetic valve 69 may not behave in accordance with instructions from the control unit C. Therefore, if $T_W < T_{WL}$, program proceeds to the step S2 to set $D_{OUT}$ to 0.

If it is determined at step S5 that $T_W \geq T_{WL}$, the program proceeds to step S6, where it is determined whether or not the engine coolant temperature $T_W$ exceeds a predetermined higher value $T_{WH}$. If the engine coolant temperature $T_W$ exceeds the predetermined higher value $T_{WH}$, the program proceeds to step S2. The possible operating conditions which satisfy $T_W > T_{WH}$ are, for example, those in which the engine has been continuously operating under a high load condition, or wherein the ambient air temperature is very high, or wherein the engine coolant system of the engine cylinder block E is malfunctioning. Under such high temperature conditions of the engine, the intake air density is low to decrease the charging efficiency, which may also result in abnormal combustion such as misfiring. If supercharging pressure is introduced into the combustion chambers when the engine is under such unstable operating conditions, the engine operation will be made even more unstable. Therefore, at step S2, the duty ratio $D_{OUT}$ is set to 0. Further, when the ambient air temperature is very high, the inductance of the solenoid 70 is liable to change, so that it may behave differently from a predetermined behavior under normal inductance conditions. For the purpose of avoiding this problem the program proceeds to the step S6. If it is determined at the the step S6 that $T_W \leq T_{WH}$, the program proceeds to step S7. In other words, if it is determined that the engine coolant temperature $T_W$ is equal to or higher than the predetermined lower value $T_{WL}$ and equal to or lower than the predetermined higher value $T_{WH}$, the program proceeds to step S7, otherwise, program proceeds to the step S2.

Figure 8:
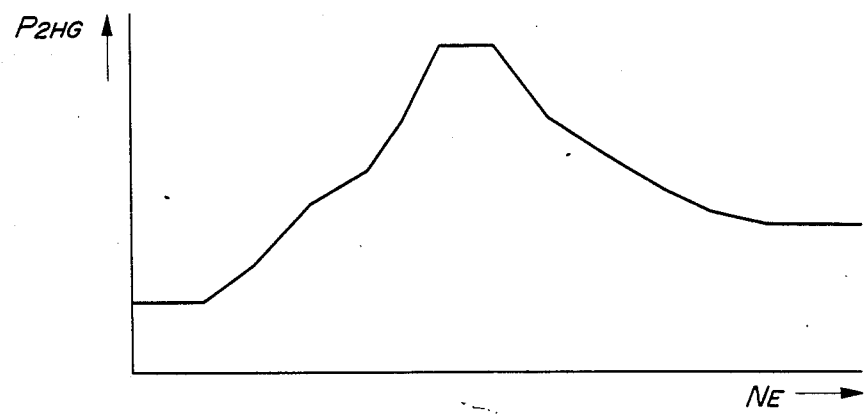
FIG. 8 is a graph showing the relationship between a high supercharging pressure-discriminating value $P_{2HG}$ and the engine rotational speed Ne.

At step S7, it is determined whether or not supercharging pressure exceeds a predetermined high supercharging pressure-discriminating value $P_{2HG}$ set as shown in FIG. 8. If $P_2 > P_{2HG}$, the program proceeds to step S2. If $P_2 \leq P_{2HG}$, the program proceeds to step S8. The predetermined high supercharging pressure-discriminating value $P_{2HG}$ varies in accordance with the engine rotational speed $N_E$. The value $P_{2HG}$ is provided in order that the supercharging pressure may not be higher than a limit value associated with the amount of advancement of ignition timing above which knocking can take place, the limit value corresponding to the engine rotational speed $N_E$ so as to ensure attainment of the maximum output of the engine immediately under the limit value. When the engine rotational speed $N_E$ is in a low range, where the transmission is set into a low speed position, the torque which is applied to the transmission component parts increases; whereas when the engine rotational speed $N_E$ is in a high engine rotational speed range, knocking can take place, adversely affecting the durability of the engine main body E. Therefore, $P_{2HG}$ is set to lower values associated with a medium engine rotational speed range. If a supercharging pressure $P_2$ which exceeds the high supercharging pressure-discriminating value $P_{2HG}$ is detected, program skips over the steps S2, S3 to step S4, where the duty ratio $D_{OUT}$ is set to 0%, whereby the supercharging pressure $P_2$ is decreased, and at the same time fuel injection is inhibited.

At step S8, a basic duty ratio $D_M$ is determined as a basic supercharging pressure control amount. The basic duty ratio $D_M$ is obtained from a map in accordance with the engine rotational speed $N_E$ and the throttle valve opening $\theta_{TH}$, whereby it is made possible to accurately determine operating conditions of the engine. This is because it is impossible to accurately determine decelerating or transitional operating conditions of the engine by the use of the engine rotational speed $N_E$ alone or the throttle valve opening $\theta_{TH}$ alone. In this embodiment, the throttle valve opening $\theta_{TH}$ is adopted as a parameter representative of load on the engine. However, $\theta_{TH}$ may be replaced by the intake pressure $P_B$ or the fuel injection amount.

At step S9, it is determined whether or not the automatic transmission is in a first speed position. If the automatic transmission is in the first speed position, the program proceeds to step S10; and if the transmission is in a position other than the first speed position, the program proceeds to step S11.

Figure 9:
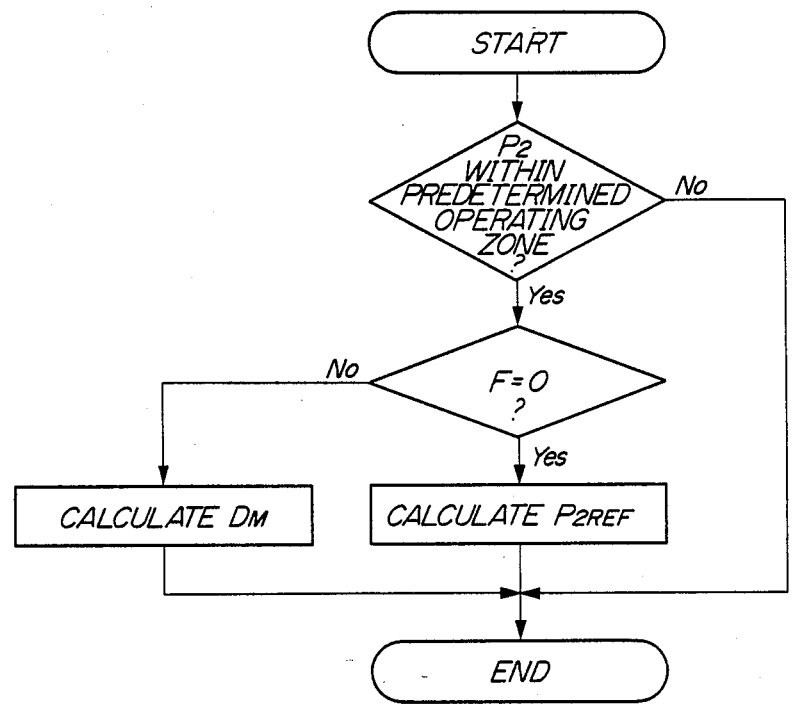
FIG. 9 is a flowchart showing a subroutine for subtraction from a basic duty ratio and from desired superchanging pressure, which is executed when the transmission is in the first speed position.
Figure 10:
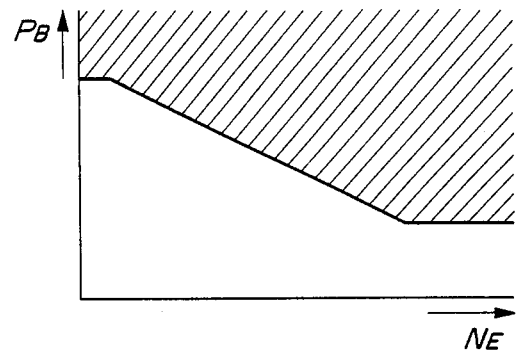
FIG. 10 is a diagram showing a predetermined operating zone to be discriminated in the subroutine shown in FIG. 9.

At step S10, subtraction is effected from the basic duty ratio $D_M$ in accordance with a subroutine shown in FIG. 9. More specifically, a predetermined operating zone is provided as shown by hatching in FIG. 10, which is determined by the engine rotational speed $N_E$ and the intake pressure $P_B$; in which zone subtraction from the basic duty ratio $D_M$ should be effected. Depending on whether or not the operating condition of the engine is within this predetermined operating zone, it is determined whether or not subtraction should be effected from the basic duty ratio $D_M$. In FIG. 10, the torque of the engine is determined based upon the engine rotational speed $N_E$ and the intake pressure $P_B$, and the border line of the predetermined operating zone indicates the maximum allowable torque amount applied to the gear shaft of the transmission when the transmission is in the first speed position. In other words, in order to prevent excessive load on the gear shaft when the transmission is in the first speed position, the torque of the engine in each operating region is monitored accurately by the use of the engine rotational speed $N_E$ and the intake pressure $P_B$. If the operating condition of the engine is outside the predetermined operating zone, the program proceeds to step 12 without correcting the basic duty ratio $D_M$; whereas if the operating condition of the engine is within the predetermined operating zone it is determined whether or not a flag F is 0, i.e. whether the engine is in the feedback control mode. If the engine is in the open loop control mode, subtraction of $D_M = D_M - D_F$ is carried out. If the engine is in the feedback control mode, subtraction of $P_{2REF} = P_{2REF} - \Delta P_{2REFF}$ is carried out. $D_F$ is a predetermined decremental value, $P_{2REF}$ is a desired value of supercharging pressure used in the feedback control mode, and $\Delta P_{2REFF}$ is also a predetermined decremental value. These values will be described in detail below where the feedback control is described.

Figure 11:
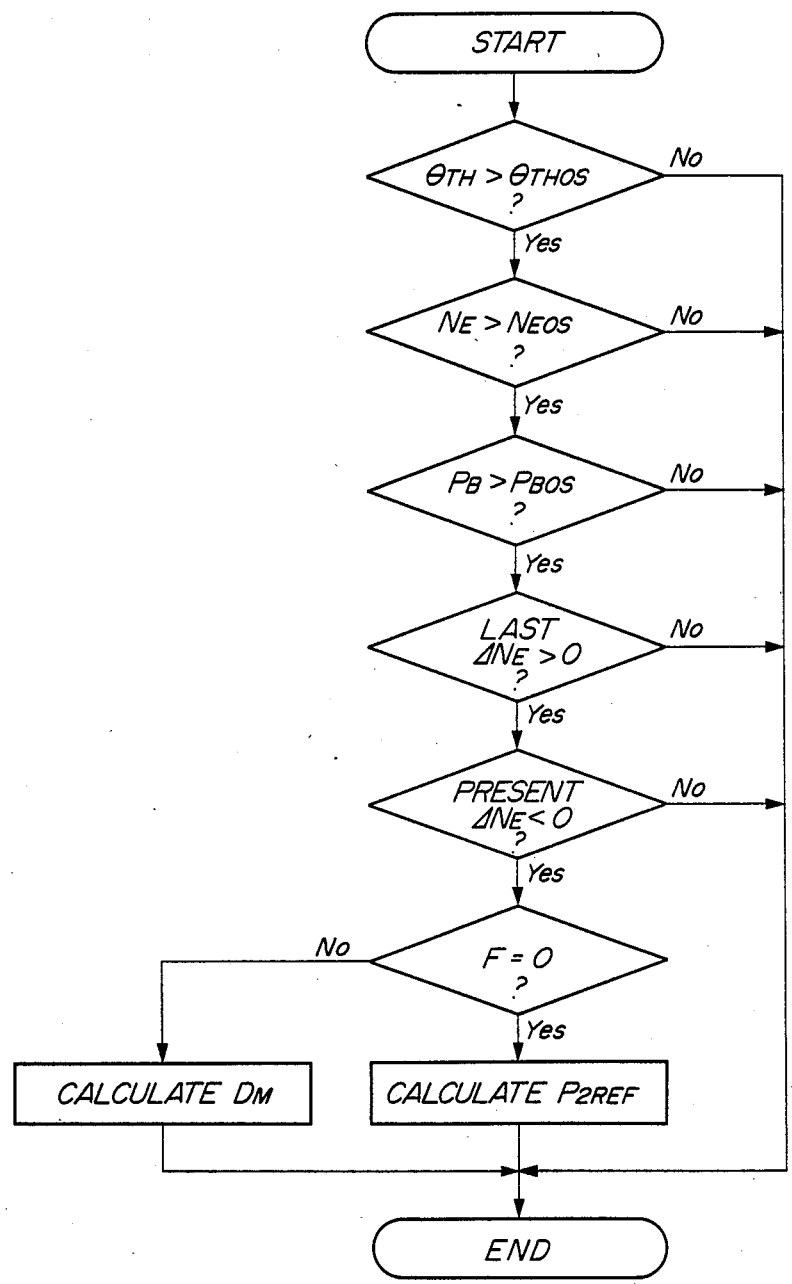
FIG. 11 is a flowchart showing a subroutine for subtraction from the basic duty ratio and from the desired supercharging pressure, which is executed when the transmission is in a position other than the first speed position.

At step S11, subtraction is effected from the basic duty ratio $D_M$ in accordance with a subroutine shown in FIG. 11. More specifically, if the throttle valve opening $\theta_{TH}$ is above a predetermined value $\theta_{THOS}$, the engine rotational speed $N_E$ is above a predetermined value $N_{EOS}$, the intake pressure $P_B$ is above a predetermined value $P_{BOS}$; change rate $\Delta N_E$ of the engine rotational speed $N_E$ detected in the last loop is positive, and the change rate $\Delta N_E$ of the engine rotational speed $N_E$ detected in the present loop is negative, subtraction of $D_M = D_M - D_{OS}$ is carried out in the open loop control mode, and subtraction of $P_{2REF} = P_{2REF} - \Delta P_{2REFOS}$ is carried out in the feedback control mode. Otherwise, the program proceeds to step S12 without correcting the basic duty ratio $D_M$. $D_{OS}$ and $\Delta P_{2REFOS}$ are predetermined decremental values.

At step S12, it is determined whether or not the throttle valve opening $\theta_{TH}$ is above a predetermined value $\theta_{THFB}$. This predetermined value $\theta_{THFB}$ is for determining whether the control mode should be shifted from the open loop control mode to the feedback control mode. By adopting the throttle valve opening $\theta_{TH}$ as the determining parameter, it is possible to accurately determine whether the driver of the vehicle demands acceleration, i.e. supercharging. If $\theta_{TH} \leq \theta_{THFB}$, i.e. if the open loop control is to be continued, the $t_{FBDLY}$ timer shown in FIG. 7 is reset at step S13, and then the program proceeds to step S14.

At step S14, a duty ratio correction coefficient $K_{MODij}$ determined by the engine rotational speed $N_E$ and the intake air temperature $T_A$ is searched for in a map. As described later, the correction coefficient $K_{MODij}$ is learned when the optimum supercharging pressure P2 is within a predetermined difference range, and renewed by learning. The initial value of the correction coefficient $K_{MODij}$ is set to 1.

Figure 12:
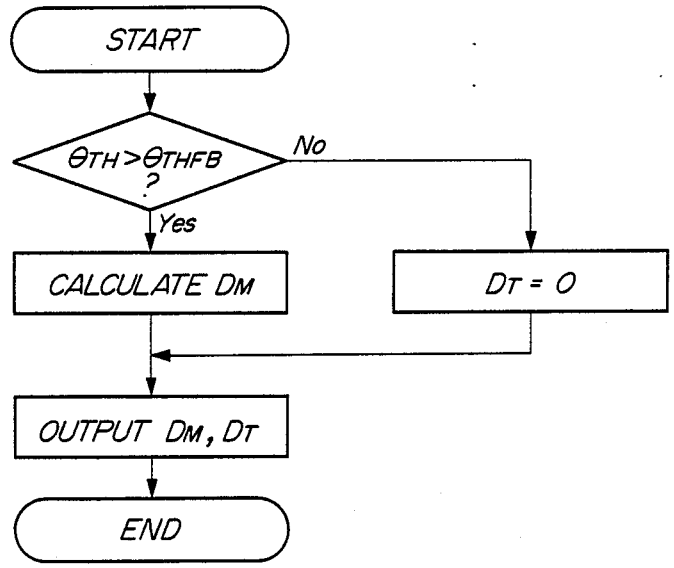
FIG. 12 is a flowchart showing a subroutine for determining a decremental value $D_T$.

At step S15, an atmospheric pressure-dependent correction coefficient $K_{PATC}$ (0.8 to 1.0) for correcting the duty ratio is determined depending on the atmospheric pressure $P_A$. At step S16, an intake air temperature-dependent correction coefficient $K_{TATC}$ (0.8 to 1.3) for correcting the duty ratio is determined depending on the intake air temperature $T_A$. At step S17, a decremental value $D_T$ depending on the change rate $\Delta P_2$ of supercharging pressure $P_2$ is determined in accordance with a subroutine shown in FIG. 12. More specifically, if the throttle valve opening $\theta_{TH}$ is larger than the predetermined value $\theta_{THFB}$, the decremental value $D_T$ is determined by the change rate $\Delta P_2$ of supercharging pressure $P_2$ and the engine rotational speed $N_E$ as shown in FIG. 13. If $\theta_{TH} \leq \theta_{THFB}$, $D_T$ is set to 0%.

Figure 13A:
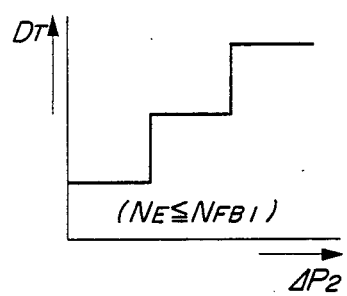
FIGS. 13(a), 13(b) and 13(c), collectively referred to hereafter as FIG. 13, constitute a diagram showing maps of the decremental value.
Figure 13B:
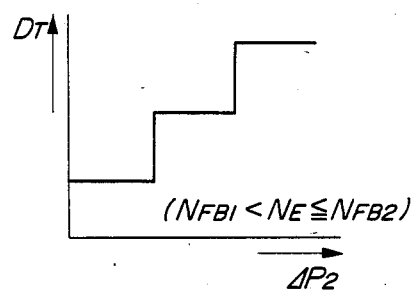
Figure 13C:
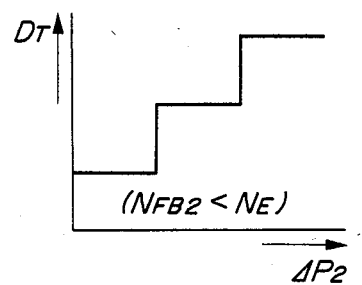
Figure 20:
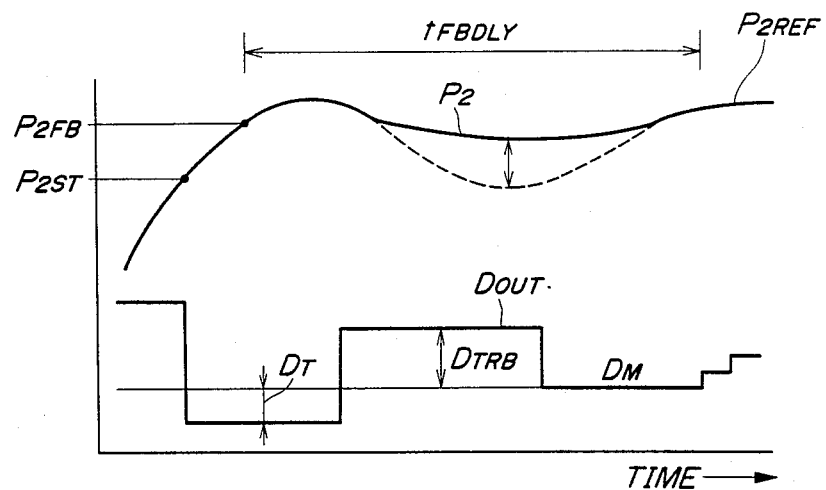
FIG. 20 is a diagram showing changes in duty ratio and supercharging pressure, which can take place when the control mode is shifted from the open loop control mode to the feedback control mode.

FIG. 13(a) shows a map of the decremental value $D_T$ selected when the engine rotational speed $N_E$ is equal to or lower than a predetermined first changeover engine rotational speed $N_{FB1}$ (e.g. 3000 rpm); FIG. 13(b) shows a map of the decremental value $D_T$ selected when the engine rotational speed $N_E$ is above the first changeover engine rotational speed $N_{FB1}$ and equal to or lower than a predetermined second changeover engine rotational speed $N_{FB2}$ (e.g. 4500 rpm); and FIG. 13(c) shows a map of the decremental value $D_T$ selected when the engine rotational speed $N_E$ is above the second changeover engine rotational speed $N_{FB2}$. The decremental value $D_T$ is applied, as shown in FIG. 20, when the actual supercharging pressure $P_2$ becomes higher than a predetermined value $P_{2ST}$ which is lower than a desired value $P_{2REF}$ of supercharging pressure, so that overshooting during rising of the supercharging pressure can be prevented. Further, $D_T$ is set, as shown in FIG. 13 and as described above, in accordance with the engine rotational speed $N_E$ and the change rate $\Delta P_2$ of supercharging pressure. This is because the amount of overshooting depends on the engine rotational speed $N_E$ and the change rate $\Delta P_2$ of supercharging pressure when the predetermined value $P_{2ST}$ is reached. $D_T$ is set to a larger value as $\Delta P_2$ is larger and as $N_E$ is higher.

Figure 14:
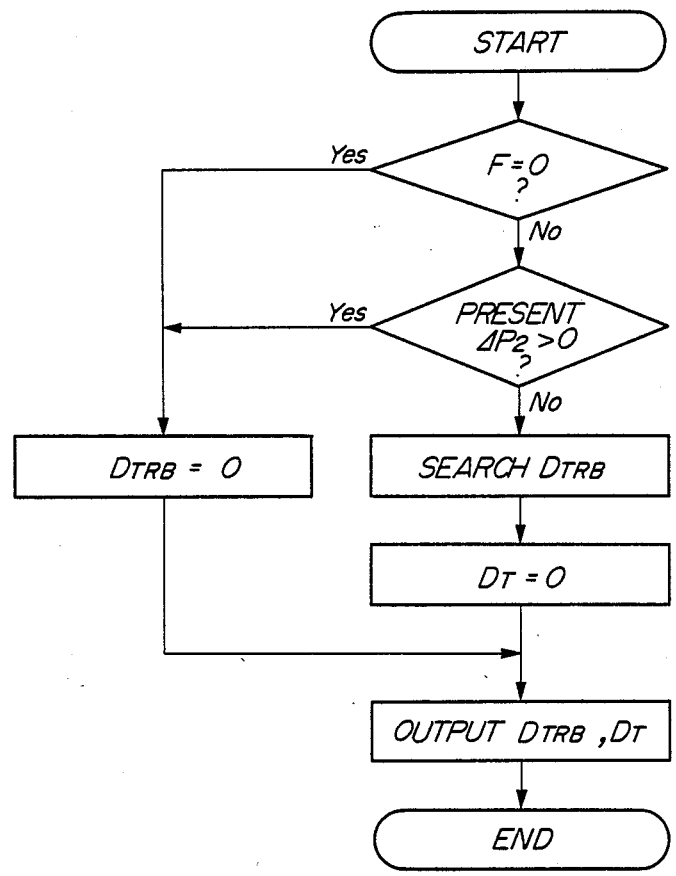
FIG. 14 is a flowchart showing a subroutine for determining an incremental value $D_{TRB}$.

At step S18, an incremental value $D_{TRB}$ is determined in accordance with a subroutine shown in FIG. 14. More specifically, if the engine is in the open loop control mode, and at the same time the change rate $\Delta P_2$ of supercharging pressure is negative, the incremental value $D_{TRB}$ is determined by $\Delta P_2$ and the engine rotational speed $N_E$ as shown in FIG. 15, and then the decremental value $D_T$ is set to 0%. Similarly to the decremental value $D_T$, the incremental value $D_{TRB}$ is also changed as shown in FIG. 15 depending on the engine rotational speed $N_E$ and the change rate $\Delta P_2$ of supercharging pressure. $D_{TRB}$ is set to a larger value as $N_E$ is higher and as $\Delta P_2$ is larger, whereby it is possible to carry out duty ratio control in a manner ensuring stable supercharging pressure $P_2$ with almost no hunting in each operating region of the engine. In other words, according to the invention, for example, from the start of acceleration of the engine until the predetermined supercharging pressure value $P_{2ST}$ is reached, the duty ratio $D_{OUT}$ is set to and held at 100% to set the space area between the movable vanes 54 and the stationary vanes 49 to the minimum, to thereby increase the supercharging pressure $P_2$ at a high rate and hence enhance the accelerabity of the engine. After the supercharging pressure $P_2$ has exceeded the predetermined value $P_{2ST}$, the predetermined incremental value $D_{TRB}$ is added to $D_M$ so as to prevent hunting of supercharging pressure, which would otherwise occur in reaction to subtraction of the decremental value $D_T$ for prevention of overshooting, whereby it is possible to carry out stable supercharging pressure control in each operating region of the engine.

After the correction coefficients $K_{MODij}$, $K_{PATC}$, and $K_{TATC}$, the decremental value $D_T$, and the incremental value $D_{TRB}$ are thus determined, the program proceeds to step S19.

At step S19, the duty ratio $D_{OUT}$ is calculated by the following equation:

$$D_{OUT} = K_{TATC} \times K_{PATC} \times K_{MODij} \times (D_M + D_{TRB} - D_T)$$

Further, at step S20, the flag F is set to 0 to indicate that the engine is in the open loop control mode, and at step S21, the duty ratio $D_{OUT}$ is checked to make sure that it is within a predetermined range defined by upper and lower limit values. More specifically, the upper and lower limit values of the duty ratio $D_{OUT}$ are predetermined in accordance with the engine rotational speed $N_E$, and the calculated duty ratio $D_{OUT}$ is checked so as to make sure that it is within the predetermined range. If the calculated duty ratio $D_{OUT}$ is within the predetermined range, the duty ratio output signal $D_{OUT}$ is provided at step S4.

If it is determined at step S12 that $\theta_{TH} > \theta_{THFB}$, the program proceeds to step S22, where it is determined whether or not the values of the flag F assumed in the last loop was 1, i.e. whether the engine was in the open loop control mode in the last loop. If F=1, it is determined at step S23 whether or not the supercharging pressure $P_2$ is above the minimum opening control-terminating value $P_{2ST}$. The minimum opening control-terminating value $P_{2ST}$ is obtained by the equation $P_{2ST} = P_{2REF} - \Delta P_{2ST}$. $\Delta P_{2ST}$ is set depending on the engine rotational speed $N_E$, as shown in FIG. 16. Here, similarly to the above-described $D_T$ and $D_{TRB}$, $\Delta P_{2ST}$ is set in accordance with the engine rotational speed $N_E$ and the change rate $\Delta P_2$ of supercharging pressure to ensure optimum duty ratio control. $\Delta P_{2ST}$ is set to a larger value as the engine rotational speed $N_E$ increases and as the rate of change $\Delta P_2$ of supercharging pressure increases.

Further, since the minimum opening control-terminating pressure (the value of which is utilized at step 23 described above and step 27 described below to control the minimum opening), is set to a value lower than the desired supercharging pressure $P_{2REF}$ by the first subtraction term $\Delta P_{2ST}$, overboost in the supercharging pressure can be positively prevented, and hence the accelerability of the engine can be enhanced.

Also, since the first subtraction term $\Delta P_{2ST}$ is set to a larger value as the rate of increase of the supercharging pressure increases, the minimum opening control-terminating pressure ($P_{2REF} - \Delta P_{2ST}$) is set to a lower value as the increase rate of the supercharging pressure is larger so that the minimum opening control, which is executed at the step 23 described above and at the step 27 described below, can be terminated at appropriate timing in response to the actual rate of rise of the supercharging pressure, thereby further enhancing the accelerability of the engine.

If $P_2 > P_{2ST}$ at step S23, it is determined at step S24 whether or not the supercharging pressure $P_2$ is above a feedback control-starting value $P_{2FB}$. The feedback control-starting supercharging pressure $P_{2FB}$ is obtained by the equation $P_{2FB} = P_{2REF} - \Delta P_{2FB}$. As shown in FIG. 17, $\Delta P_{2FB}$ is set depending on the engine rotational speed $N_E$. Similarly to the above-described $\Delta P_{2ST}$, $D_T$, and $D_{TRB}$, $\Delta P_{2FB}$ is determined in accordance with the engine rotational speed $N_E$ and the change rate $\Delta P_2$ of supercharging pressure to ensure optimum duty ratio control. $\Delta P_{2FB}$ is set to a larger value as the engine rotational speed $N_E$ is higher and as the change rate $\Delta P_2$ of supercharging pressure is larger. If $P_2 > P_{2FB}$ at step S24, the program proceeds to a step S25.

At step S25, it is determined whether or not the delaying time period $t_{FBDLY}$ has elapsed. If the delaying time period $t_{FBDLY}$ has elapsed, the program proceeds to step S26. In the meanwhile, if F=0 at step S22, the program skips over steps S23 to S25 to step S26; if $P_2 \leq P_{2ST}$ at step S23, the program proceeds to step S27, if $P_2 \leq P_{2FB}$ at step S24, the program proceeds to step S13; and if the delaying time period $t_{FBDLY}$ has not elapsed at step S25, the program proceeds to step S14.

At step S27, the duty ratio $D_{OUT}$ is set to 100%, and at step S28 the $t_{FBDLY}$ timer is reset. Then the program proceeds to step S4. Thus, the rate of rise of the supercharging pressure below $P_{2ST}$ is increased to thereby improve the accelerability of the engine.

At step S26, it is determined whether or not the absolute value of change rate $\Delta P_2$ of supercharging pressure is above a supercharging pressure difference $G_{dP2}$ for determining whether to start the feedback control. The supercharging pressure difference $G_{dP2}$ is set, for example, at a value of 30 mmHg. If the absolute value of $\Delta P_2$ is above the value $G_{dP2}$, the program proceeds to step S14; and if the absolute value of $\Delta P_2$ is equal to or lower than the value $G_{dP2}$, the program proceeds to step S29. If the feedback control is started when $\Delta P_2 > G_{dP2}$, it may result in hunting. Therefore, the program proceeds to step S14 to carry out the open loop control mode. As described above, in the open loop control mode, correction of the basic duty ratio $D_M$ by $D_T$ and $D_{TRB}$ is carried out to prevent hunting and overshooting of supercharging pressure. Therefore, step S26 is provided mainly for a fail-safe purpose.

The feedback control is started at step S29, where the desired supercharging pressure $P_{2REF}$ is determined depending on the engine rotational speed $N_E$ and the intake air temperature $T_A$. The feedback control is started on condition that $\theta_{TH} > \theta_{THFB}$ at step S12. Under this condition, the desired supercharging pressure $P_{2REF}$ is determined by the use of the engine rotational speed $N_E$ and the intake air temperature $T_A$ as parameters enabling accurate determination of operating conditions of the engine. If $\theta_{TH} > \theta_{THFB}$, i.e. under medium or high load operating conditions, the engine rotational speed $N_E$ and the throttle valve opening $\theta_{TH}$ behave approximately in the same manner. Therefore, $N_E$ can be an effective parameter representing operating conditions of the engine. In the meanwhile, the intake air temperature $T_A$ is the temperature of intake air downstream of the intercooler 4 as shown in FIG. 2, and therefore can be a parameter accurately representing the condition of intake air introduced into the combustion chambers. Therefore, it is possible to set the desired supercharging pressure $P_{2REF}$ to values exactly responsive to operating conditions of the engine by the use of a map determined by the engine rotational speed $N_E$ and the intake air temperature $T_A$. The desired supercharging pressure $P_{2REF}$ is set to a lower value as the intake air temperature $T_A$ is decreased. More specifically, the rate of increase the supercharging pressure tends to be greater when the intake air temperature $T_A$ is lower. Therefore, the desired supercharging pressure is set in the above manner, whereby the minimum opening control can be terminated with appropriate timing, and hence the accelerability of the engine can be further improved.

At step S30, it is determined whether or not the automatic transmission is in the first speed position. If the automatic transmission is in the first speed position, calculation of $P_{2REF}=P_{2REF}-\Delta P_{2REFF}$ is carried out at step S31 in accordance with the subroutine shown in FIG. 9 when the operating condition of the engine is within the predetermined operating zone shown by hatching in FIG. 10, and then the program proceeds to step S33. $\Delta P_{2REFF}$ is a predetermined decremental value which is applied when the transmission is in the first speed position. If it is determined at the step S30 that the transmission is in a position other than the first speed position, calculation of $P_{2REF}=P_{2REF}-\Delta P_{2REFOS}$ is carried out at step S32 in accordance with the subroutine shown in FIG. 11, and then the program proceeds to step S33. $\Delta P_{2REFOS}$ is a predetermined decremental value which is applied when the transmission is in a position other than the first speed position.

At step S33, an atmospsheric pressure-dependent correction coefficient $K_{PAP2}$ for correcting the supercharging pressure and the atmospheric pressure-dependent correction coefficient $K_{PATC}$ for correcting the duty ratio are determined in accordance with the atmospheric pressure $P_A$, and then at step S34, the following calculation is carried out:

$$P_{2REF}=P_{2REF}\times K_{PAP2}\times K_{REFTB}$$

where $K_{REFTB}$ is a correction coefficient responsive to a knocking condition of the engine.

At step S35, it is determined whether the absolute value of the difference between the desired supercharging pressure $P_{2REF}$ and the supercharging pressure $P_2$ detected in the present loop is equal to or greater than a predetermined value $G_{P2}$. The predetermined value $G_{P2}$ is a value defining the insensitive pressure width in the feedback control mode, and is set, for example, at 20 mmHg. If the absolute value of the difference between the desired supercharging pressure and the actual supercharging pressure is equal to or higher than the predetermined value $G_{P2}$, the program proceeds to step S36, and if not, the program proceeds to step S43.

Figure 18:
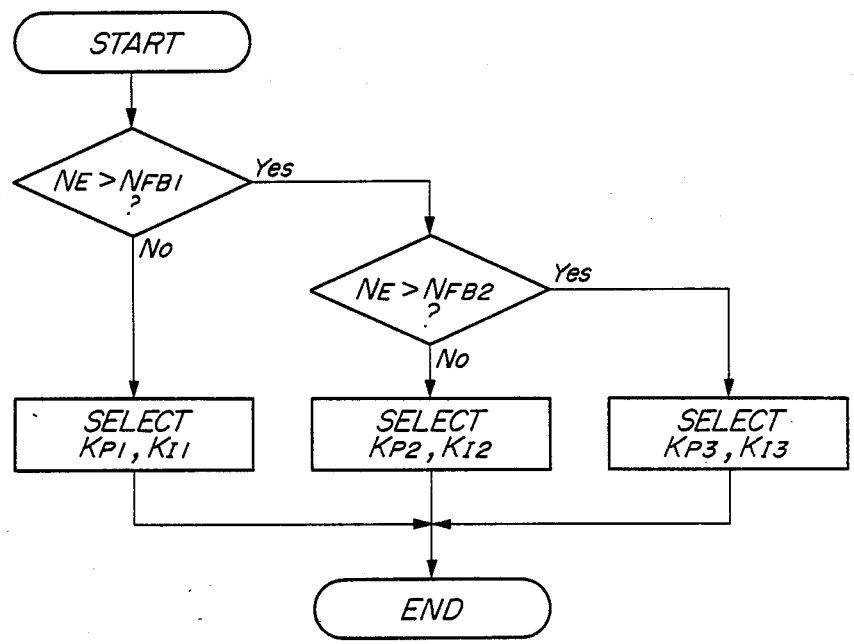
FIG. 18 is a flowchart showing a subroutine for determining feedback coefficients for determining, respectively, a proportional control term and an integral control term.

At step S36, a proportional control term $D_P$ for correcting the duty ratio is calculated by the following equation:

$$D_P=K_P\times(P_{2REF}-P_2)$$

where $K_P$ is a feedback coefficient for the proportional control term, and is obtained in accordance with a subroutine shown in FIG. 18. In FIG. 18, if the engine rotational speed $N_E$ is equal to or lower than the first changeover engine rotational speed $N_{FB1}$, $K_{P1}$ is obtained and at the same time a feedback coefficient $K_{I1}$ for an integral control term, described later, is obtained. If the engine rotational speed $N_E$ is above the first changeover engine rotational speed $N_{FB1}$ and equal to or lower than the second changeover engine rotational speed $N_{FB2}$, $K_{P2}$ and $K_{PI2}$ are obtained. If the engine rotational speed $N_E$ is above the second changeover engine rotational speed $N_{FB2}$, $K_{P3}$ and $K_{PI3}$ are obtained.

At step S37, in a manner similarly to step S14, the correction coefficient $K_{MODij}$ is determined in accordance with the engine rotational speed $N_E$ and the intake air temperature $T_A$. At step S38, it is determined whether or not the value of the flag F assumed in the last loop was 1, i.e. whether or not the present loop is the first loop in which the feedback control mode has been started. If F=1, an integral control term $D_{I(n-1)}$ applied in the last loop is obtained at step S39 by the following equation:

$$D_{I(n-1)}=K_{TATC}\times K_{PATC}\times D_M\times(K_{MODij}-1)$$

After this calculation, the program proceeds to step S40. If F=0 at the step S38, the program skips over step S39 to step S40.

At step S40, an integral control term $D_{In}$ for the present loop is calculated by the following equation:

$$D_{In}=D_{I(n-1)}+K_I+(P_{2REF}-P_2)$$

Then the program proceeds to step S41, where the duty ratio $D_{OUT}$ is calculated by the following equation:

$$D_{OUT}=K_{TATC}\times K_{PATC}\times D_M+D_P+D_{In}$$

Then, at step S42, the flag F is set to 0, and the program proceeds to step S21.

If the absolute value of the difference between the desired supercharging pressure $P_{2REF}$ and the actual supercharging pressure $P_2$ is smaller than the predetermined value $G_{P2}$, $D_P$ is set to 0 and $D_{In}$ is set to $D_{I(n-1)}$ at step S43. Then at steps S44 to S47, it is determined whether or not the engine coolant temperature $T_W$ is within a predetermined range, i.e. above $T_{WMODL}$ and below $T_{WMODH}$, whether or not a retarding amount $T_{ZRET}$ is 0, i.e. whether or not the engine is under a knocking condition, whether or not the transmission is in a position other than the first speed position, and whether or not $K_{REFTB}$ is equal to or lower than 1.0. If the response to all these inquiries is affirmative, the program proceeds to a step S48; otherwise, the program proceeds to the step S41.

At step S48, a coefficient $K_R$ for learning the correction coefficient $K_{MODij}$ for duty ratio control is calculated by the following equation:

$$K_R=(K_{TATC}\times D_M+D_{In})/(K_{TATC}\times D_M)$$

At step S49, in order to determine and learn the correction coefficient $K_{MODij}$, the following calculation is carried out:

$$K_{MODij}=(C_{MOD}\times K_R)/65,536+[(65,536-C_{MOD})\times D_{MODij}]/65,536$$

At step S50, the $K_{MODij}$ obtained at step S49 is stored.

According to the above-described control of the duty ratio of the solenoid 70 of the electromagnetic control valve 69, under the condition that the automatic transmission is in the first speed position, if the engine is in the open loop control mode, $D_F$ is subtracted from the basic duty ratio $D_M$ at step S10 when the operating condition of the engine is in the predetermined operating zone shown in FIG. 10; and if the engine is in the feedback control mode, $\Delta P_{2REF}$ is substracted from the desired supercharging pressure $P_{2REF}$ at step S31 when the operating condition of the engine is in the predetermined operating zone. Thus, excessive load on the automatic transmission due to sudden start of the vehicle and overload on the engine when the automatic transmission is in the first speed position can be prevented by decreasing the supercharging pressure through subtraction from the basic duty ratio $D_M$. Further, even if the control mode is shifted from the open loop control mode to the feedback control mode when the transmission is in the first speed position, occurrence of hunting in the transitional state can be prevented since subtraction from the desired supercharging pressure $P_{2REF}$ is carried out.

Figure 19:
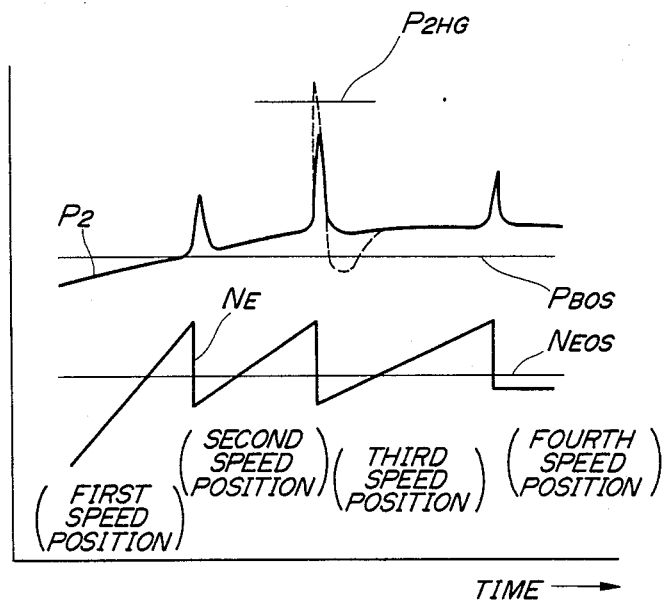
FIG. 19 is a diagram showing a change in the intake pressure, which can take place when the gear position of the transmission is shifted.

Suppose that the gear position of the transmission is shifted as shown in the lower part of FIG. 19. As known, when the gear position of the transmission is shifted, the engine rotational speed $N_E$ is decreased. However, there is a time lag before the actuator 60 starts to operate in response to a signal from the control unit C. Therefore, the supercharging pressure $P_2$ does not properly correspond to the engine rotational speed $N_E$ and overshooting of the supercharging pressure may occur. As shown by the broken line in FIG. 19, when the gear position of the transmission is shifted immediately after acceleration in a medium or high engine speed range, the supercharging pressure may exceed the upper limit value $P_{2HG}$. However, in the embodiment of FIG. 6 at step S11 and at step S32, subtraction from the basic duty ratio $D_M$ and subtraction from the desired supercharging pressure $P_{2REF}$ are carried out, respectively, in accordance with the subroutine shown in FIG. 11. More specifically, when the gear position of the transmission is shifted, under the conditions that the throttle valve opening $\theta_{TH}$ is above the predetermined value $\theta_{THOS}$, the engine rotational speed $N_E$ is above the predetermined value $N_{EOS}$, and the intake pressure $P_B$ is above the predetermined value $P_{BOS}$; i.e. in the medium or high speed range, $D_{OS}$ is subtracted from the basic duty ratio $D_M$ in the open loop control mode depending on the change rate $\Delta P_2$ of supercharging pressure $P_2$; and $\Delta P_{2REFOS}$ is subtracted from the desired supercharging pressure $P_{2REF}$ in the feedback control mode. Thus, as shown by the solid line graph in the upper portion of FIG. 19, overshooting at the time of shifting of the transmission position is greatly reduced, whereby it is possible to prevent hunting and carry out stable supercharging pressure control.

Further, when the control mode is shifted from the open loop control mode to the feedback control mode, as shown in FIG. 20, a drop in the supercharging pressure $P_2$ is prevented; whereby the control mode can be smoothly shifted to the feedback control mode. More specifically, at the start of the engine, the duty ratio $D_{OUT}$ is set to 0%, and in the open loop control mode in which the throttle valve opening $\theta_{TH}$ is below the predetermined value $\theta_{THFB}$, $D_T$ is set to 0% at step S18 in accordance with the subroutine shown in FIG. 14. As stated before, the control mode starts to shift from the open loop control mode to the feedback control mode when the throttle valve opening $\theta_{TH}$ has exceeded the predetermined value $\theta_{THFB}$. When the supercharging pressure $P_2$ has exceeded $P_{2ST}$ and the throttle valve opening $\theta_{TH}$ is above the predetermined value $\theta_{THFB}$, the subtraction of $D_M = D_M - D_T$ is carried out to prevent overshooting of the supercharging pressure.

In some cases, if $D_T$ alone is thus subtracted from the basic duty ratio $D_M$, the supercharging pressure $P_2$ may drop as shown by the broken line graph in the upper portion of FIG. 20, in reation to the subtraction. However, according to the control method of the invention, if $\Delta P_2 \leq 0$, $D_T$ is set to 0%, and is added to the basic duty ratio $D_M$. Therefore, the control method of the invention copes with the possible drop in the supercharging pressure $P_2$ to thereby smoothly shift to the feedback control mode while preventing hunting of the supercharging pressure.

The aforesaid control of duty ratio of the solenoid 70 of the electromagnetic control valve 69 is carried out when the electromagnetic valve 72 is closed. If the electromagnetic valve 72 is opened, intake pressure $P_B$ is introduced into the second pressure chamber 63 of the actuator 60, which in turn causes the movable vanes 54 of the variable capacity turbocharger 5 to operate such that the space area between the movable and stationary vanes 54, 49 is increased.

Next, with reference to FIG. 21, the manner of controlling the solenoid 73 of the electromagnetic valve 72 by the control unit C will be described below. In addition to the control of operation of the electromagnetic control valve 69 for introducing supercharging pressure $P_2$ into the first pressure chamber 62 of the actuator 60 in accordance with the main routine shown in FIG. 6, intake pressure $P_B$ is introduced into the second pressure chamber 63 of the actuator 60 by way of the electromagnetic valve 72, which makes it possible to carry out more accurate control of the supercharging pressure. The reason for this is as follows. Since the supercharging pressure $P_2$ is detected between the variable capacity turbocharger 5 and the intercooler 4, it is impossible to detect a subtle operation of the throttle valve 74. In contrast, since the intake pressure $P_B$ is detected downstream of the throttle valve 74, it is possible to detect a subtle operation thereof. Thus, by the use of both a supercharging pressure sensor $S_{P2}$ positively sensitive to the operation of the turbocharger 5 and an intake pressure sensor $S_{PB}$ positively sensitive to the operation of the throttle valve 74, the operation of the whole intake system including the turbocharger 5 can be more accurately reflected upon the control of the supercharging pressure.

At step L1, it is determined whether or not a predetermined time period, e.g. 2 minutes, has elapsed from the start of the engine. If the predetermined time period has not elapsed, the program proceeds to step L2, where the solenoid 73 is energized, whereby the actuator 60 is operated to cause the movable vanes 49 to operate such that the space area between the movable and stationary vanes 54, 49 is increased. This step can cope with the start of the engine in cold weather. Thus, excessive supercharging in cold weather is prevented, and the catalyst temperature can be gently raised. If the predetermined time period has elapsed at the step L1, the program proceeds to a step L3, where it is determined whether or not the speed V of the vehicle is above a predetermined value $V_{OP3}$; which value is provided with a hysteresis between when the vehicle speed V increases and when it decreases and is set to, for example, 90/87 km/h. If $V > V_{OP3}$, the program proceeds to step L4, whereas if $V \leq V_{OP3}$, the program proceeds to step L5.

At step L4, it is determined whether or not the throttle valve opening change rate $\Delta \theta_{TH}$ is below a predetermined value $\Delta \theta_{THOP2}$. The predetermined value $\Delta \theta_{THOP2}$ is provided with a hysteresis similar to that of the vehicle speed $V_{OP3}$. If $\Delta \theta_{TH} < \Delta \theta_{THOP2}$, the program proceeds to step L2, and otherwise, the program proceeds to step L5.

At step L5, it is determined whether or not the vehicle speed V is below a predetermined value $V_{OP1}$. The predetermined value $V_{OP1}$ also has a hysteresis and is set to, for example, 65/63 km/h. If $V < V_{OP1}$, the program proceeds to step L7, whereas if $V \geq V_{OP1}$, the program proceeds to step L6, where the solenoid 73 is deenergized. At step L7, it is determined whether or not the vehicle speed V is above a predetermined value $V_{OP2}$. The predetermined value $V_{OP2}$ also has a hysteresis, and is set to, for example, 4/3 km/h. If $V > V_{OP2}$, the program proceeds to step L12, whereas if $V \leq V_{OP2}$, the program proceeds to step L8.

At step L8, it is determined whether or not the vehicle speed V detected in the last loop is above the predetermined value $V_{OP2}$. If $V > V_{OP2}$, the program proceeds to step L9, where the $t_{OP}$ timer for counting a time period $t_{OP}$ is reset, and then the program proceeds to step L10. If $V \leq V_{OP2}$, the program directly proceeds to step L10. At step L10, it is determined whether or not the solenoid 73 was energized in the last loop. If the solenoid 73 was deenergized in the last loop, the program proceeds to step L6, whereas if it was energized in last loop, the program proceeds to step L11, where it is determined whether or not the time period $t_{OP}$ exceeds a predetermined time period $t_{OPO}$. If $t_{OP} > t_{OPO}$, the program proceeds to step L6, whereas if $t_{OP} < t_{OPO}$, the program proceeds to step L2.

At step L12, it is determined whether or not the engine rotational speed $N_E$ is below a predetermined value $N_{EOP}$. The predetermined value $N_{EOP}$ has a hysteresis, and is set to, for example, 2500/2300 rpm. If $N_E \geq N_{EOP}$, the program proceeds to step L6, whereas if $N_E < N_{EOP}$, the program proceeds to step L13.

At step L13, it is determined whether or not the intake pressure $P_B$ is below a predetermined value $P_{BOP}$. The predetermined value $P_{BOP}$ has a hysteresis, and is set to, for example, $-100/-150$ mmHg. If $P_B \geq P_{BOP}$, the program proceeds to step L6, whereas if $PB < P_{BOP}$, the program proceeds to step L14.

At step L14, it is determined whether or not the throttle valve opening $\theta_{TH}$ is below a predetermined value $\theta_{THOP}$. The predetermined value $\theta_{THOP}$ is set at 20/15 degrees. If $\theta_{TH} \geq \theta_{THOP}$, the program proceeds to step L6, whereas if $\theta_{TH} < \theta_{THOP}$, the program proceeds to step L15.

At step L15, it is determined whether or not the throttle valve opening change rate $\Delta \theta_{TH}$ is positive and at the same time below a predetermined value $\Delta \theta_{THOP1}$ which is set such that it has a hysteresis. If $0 < \Delta \theta_{TH} < \Delta \theta_{THOP1}$, the program proceeds to step L2, and otherwise, the program proceeds to the step L6.

According to the above-described control manner, if it is determined at steps L3 and L4 that the vehicle speed V is higher than 90/87 km/h, and that the acceleration thereof is gentle as shown by $0 < \Delta \theta_{TH} < \Delta \theta_{THOP2}$, the movable vanes 54 of the turbocharger 5 are operated such that the space area between the movable vanes 54 and the stationary vanes 49 is increased, whereby pumping loss can be prevented. In other words, when the vehicle is cruising at a high speed, acceleration of the engine is not required; and if the movable vanes 54 are operated such that the supercharging pressure is increased, pumping loss may occur due to rise in the back pressure in the exhaust manifold resulting from a high engine rotational speed.

If it is determined at step L5 that the vehicle is running at a speed higher than 65/63 km/h, the solenoid 73 is deenergized. This is because when the vehicle is running at such a high speed, the supercharging pressure can be sufficiently controlled by the electromagnetic control valve 69 in accordance with the routine shown in FIG. 6. Further, at steps L7 to L11, if the vehicle is running at a speed lower than 4 or 3 km/h, i.e. it is almost stationary, and at the same time if the vehicle was almost stationary in the last loop, the $t_{OP}$ timer is reset, and then until the time period, for example, one minute, has elapsed, the solenoid 73 is energized so as to operate the movable vanes 54 such that the space area between the movable and stationary vanes 54, 49 is increased. If the movable vanes 54 are in such a position as to make the space area narrower at the restart of the vehicle, the supercharging pressure $P_2$ is temporarily increased, resulting in excessive load on the starting gear etc. Therefore the solenoid 73 is energized to prevent such application of the excessive load on the starting gear etc. Further, if the movable vanes 54 are in such a position as to make the space area narrower when the vehicle is running at a speed lower than 4 or 3 km/h, rotation of the variable capacity turbocharger 5 by inertia etc. is promoted. On this occasion, the throttle valve opening $\theta_{TH}$ is almost fully closed, and therefore the supercharging pressure increases the pressure within the intake pipe on the upstream side of the throttle valve to cause surging of the intake pipe pressure. Therefore, the movable vanes 54 are operated such that the space area is increased, to prevent surging of the intake pipe pressure. In addition, control of supercharging pressure carried out at steps L7 to L11 contributes to rise in the catalyst temperature immediately after the start of the vehicle when the weather is cold.

If at steps L12 to L15, all the conditions of $V_{OP2} < V < V_{OP1}$, $N_E < N_{EOP}$, $P_B < P_{BOP}$, $\theta_{TH} < \theta_{THOP}$, and $0 < \Delta \theta_{TH} < \Delta \theta_{THOP1}$ are satisfied, i.e. if the vehicle is gently accelerated under partial load, the solenoid 73 is energized to decrease the supercharging pressure $P_2$, whereby pumping loss can be prevented.

Figure 22A:
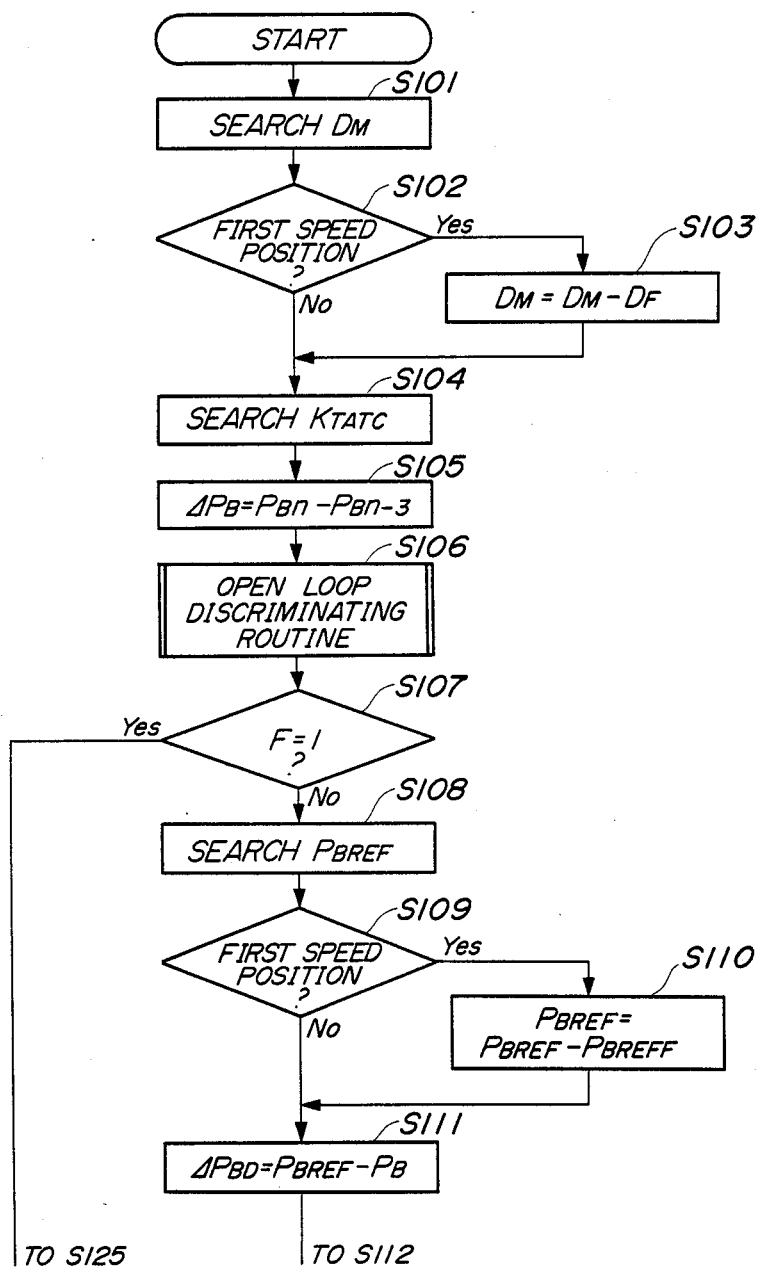
FIGS. 22A and 22B, is a flowchart showing a main routine for controlling the electromagnetic control valve which appears in FIG. 2 according to a second embodiment of the invention.
Figure 22B:
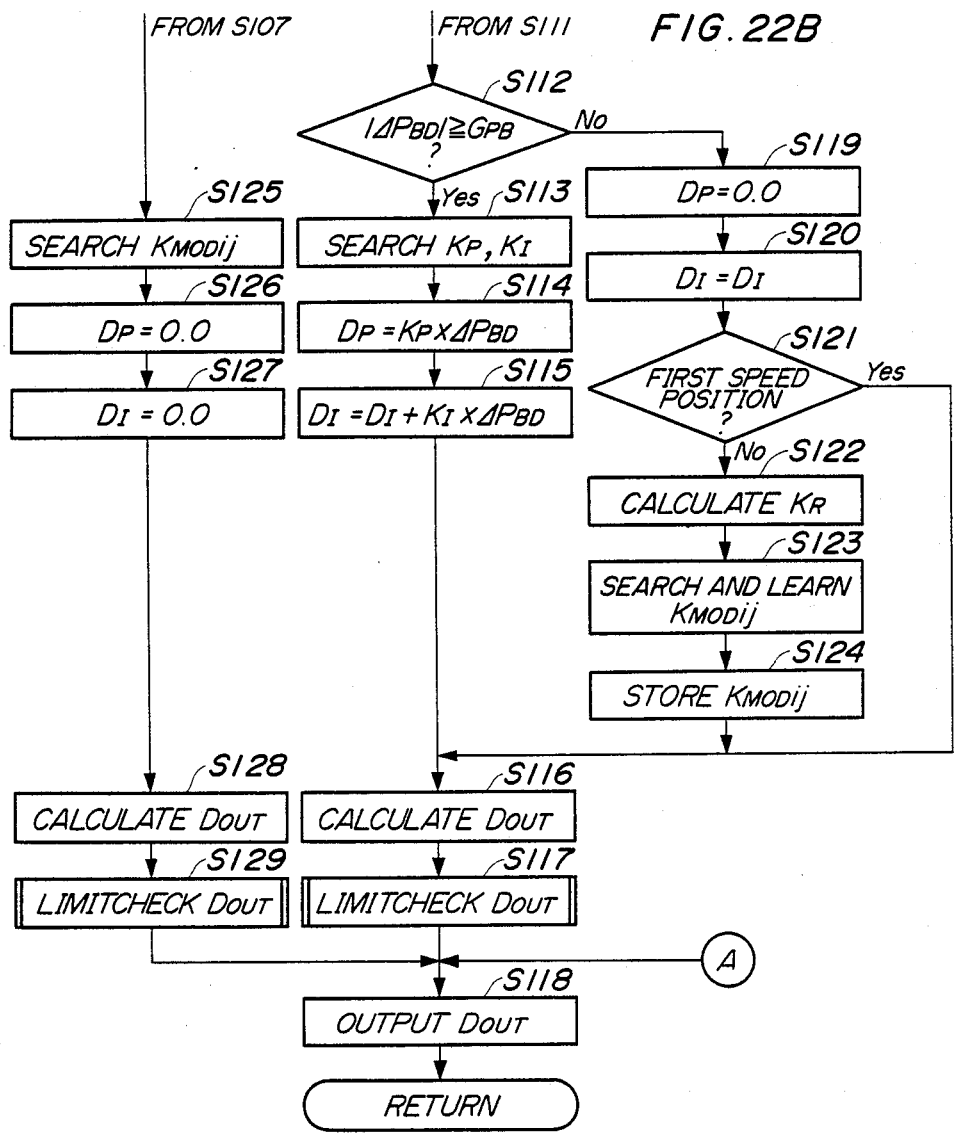
Figure 22:
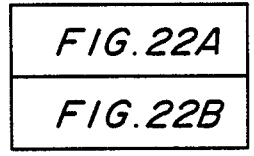
FIG. 22, a composite figure comprising

FIG. 22 shows a program for controlling the electromagnetic control valve 69 according to a second embodiment of the invention. In the second embodiment, instead of using the supercharging pressure sensor $S_{P2}$, supercharging pressure control is effected based upon the intake pressure $P_B$ detected by the intake pressure sensor $S_{PB}$. This is based on the fact that feedback control of the supercharging pressure is effected in an operating condition of the engine where the throttle valve 74 is almost fully open, in which condition information relating to the supercharging pressure can be obtained by monitoring the intake pressure $P_B$.

Figures 23, 24:
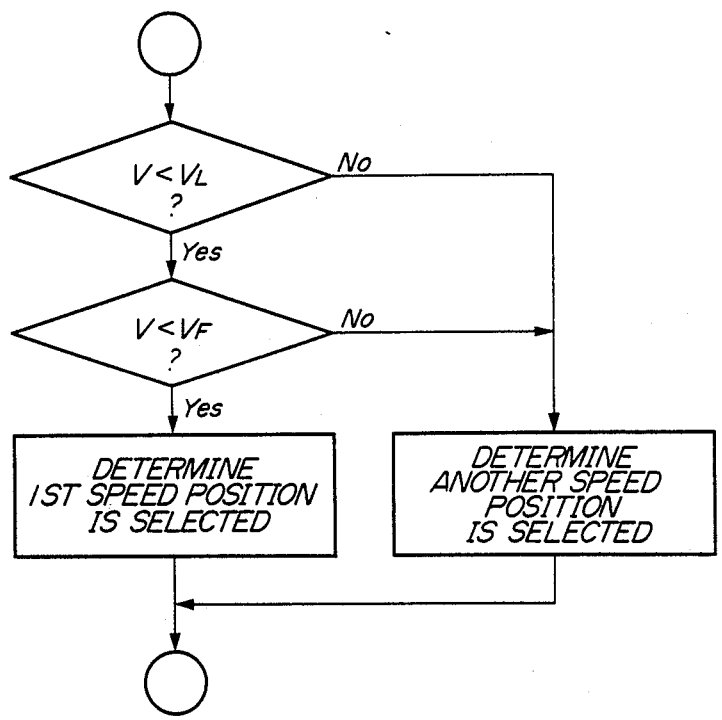
FIG. 23 is a diagram showing a map of a basic duty ratio $D_M$.
FIG. 24 is a flowchart showing a subroutine for determining the gear position of the transmission.

At step S101, the basic duty ratio $D_M$ is read from a $D_M$ map in response to the throttle valve opening $\theta_{TH}$ and the engine rotational speed $N_E$. FIG. 23 shows an example of the $D_M$ map in which the throttle valve opening $\theta_{TH}$ is classified into sixteen predetermined values $\theta_{THV1} - \theta_{THV16}$ within a predetermined range, while the engine rotational speed $N_E$ is classified into twenty predetermined values $N_{V1} - N_{V20}$. The basic duty ratio $D_M$ is determined by means of interpolation, if $\theta_{TH}$ or $N_E$ falls between respective adjacent predetermined values. By setting the basic duty ratio $D_M$ by the use of the $D_M$ map, the duty ratio $D_{OUT}$ of the electromagnetic control valve 69 can be controlled more accurately in response to operating conditions of the engine E.

Next, it is determined at step S102 whether or not the gear position of the transmission is in a first speed position. This determination is carried out in accordance with a subroutine, e.g. as shown in FIG. 24. In the subroutine, it is determined whether or not the speed V of the vehicle is lower than a predetermined value $V_L$ which is normally obtained in the first speed position. If $V < V_L$, it is then determined whether or not the vehicle speed V is smaller than a predetermined value $V_F$ corresponding to the engine rotational speed $N_E$. If $V \geq V_L$ or $V \geq V_F$, it is determined that the gear position is not in the first speed position, whereas if $V < V_L$ and at the same time $V < V_F$, it is determined that the gear position is in the first speed position.

Figure 25:
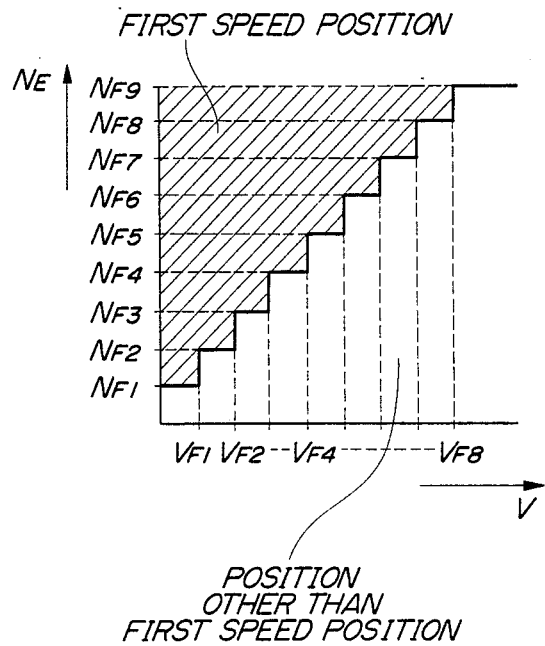
FIG. 25 is a diagram showing a table of a predetermined value $V_F$ of the vehicle speed, applied to the subroutine of FIG. 24.

FIG. 25 shows a table for determining the predetermined value $V_F$. When the transmission is in the first speed position, the ratio between the engine rotational speed $N_E$ and the vehicle speed V is constant. The table is set so as to satisfy this constant ratio relationship and is provided with predetermined values $N_{F1}$-$N_{F9}$ of the engine rotational speed and predetermined values $V_{F1}$-$V_{F8}$ of the vehicle speed V. It is determined that the transmission is in the first speed position when the vehicle speed V is lower than the predetermined value $V_F$ corresponding to the actual engine rotational speed $N_E$. By virtue of the above determinations, it is possible to determine without a gear position sensor or the like whether or not the transmission is in the first speed position, irrespective of whether the transmission is manual or automatic.

Referring again to FIG. 22, if it is determined at step S102 that the transmission is in the first speed position, then at step S103 the basic duty ratio $D_M$ determined at the step S101 is decreased by subtracting a predetermined value $D_F$ from the basic duty ratio $D_M$, followed by the program proceeding to step S104. On the other hand, if the transmission is in a position other than the first speed position, the program jumps to step S104. In this way, the basic duty ratio $D_M$ is set to a value smaller by the predetermined value $D_F$ when the transmission is in the first speed position than when it is not in another position. By virtue of this control, when the transmission is in the first speed position, the supercharging pressure is moderately suppressed so that an abrupt increase or overboost in the supercharging pressure can be prevented. Furthermore, when the transmission is in a position other than the first speed position, the supercharging pressure can be controlled to a sufficiently high value, thereby the engine to attain desired accelerability.

Figure 26:
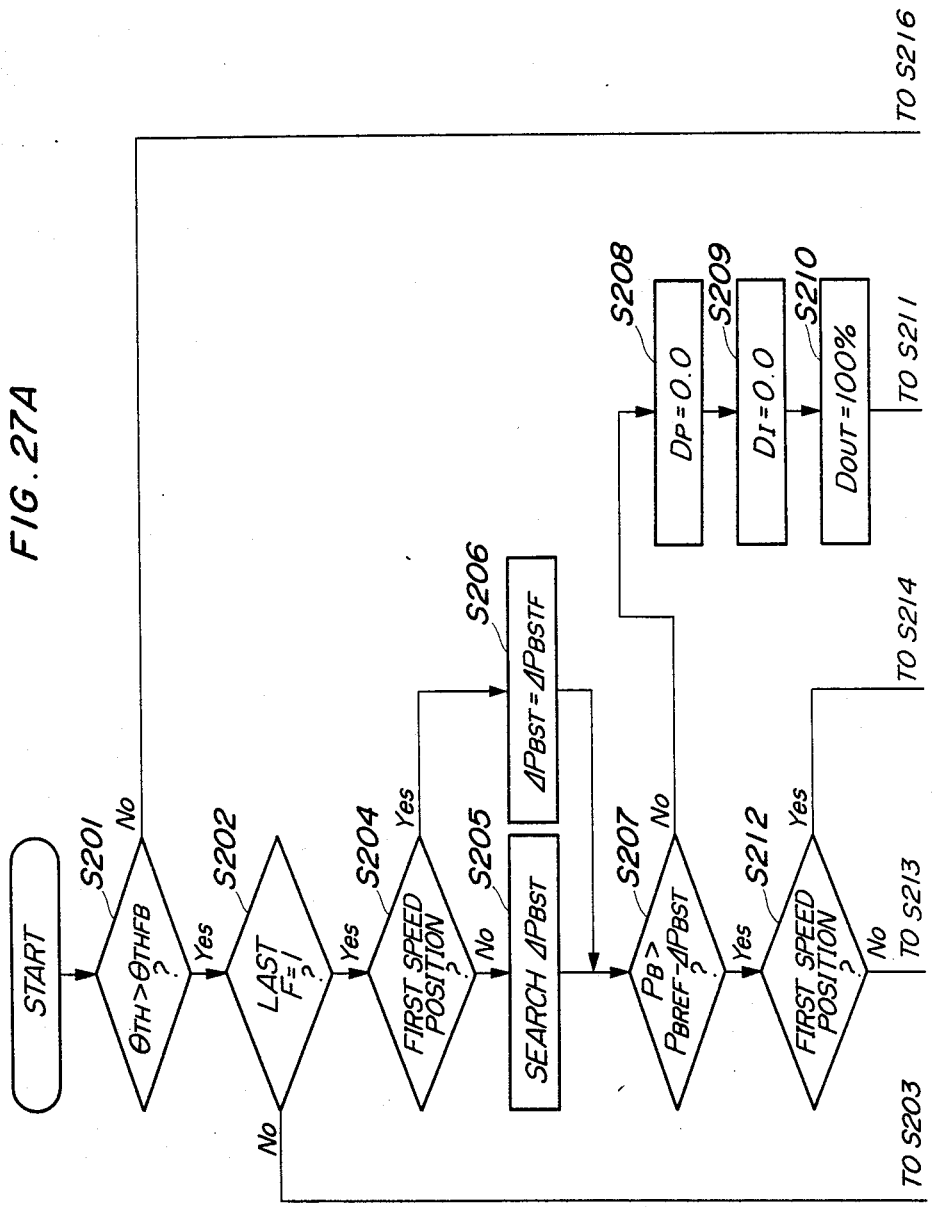
FIG. 26 is a diagram showing a map of an intake air temperature-dependent correction coefficient $K_{TATC}$.

At step S104, an intake air temperature-correcting coefficient $K_{TATC}$ is read from a $K_{TATC}$ map in response to the engine rotational speed $N_E$ and the intake air temperature $T_A$. FIG. 26 shows an example of the $K_{TATC}$ map, in which the engine rotational speed $N_E$ is classified into twenty predetermined values $N_{V1}$-$N_{V20}$ within a predetermined range, similar to the $D_M$ map; while the intake air temperature $T_A$ is classified into eight predetermined values $T_{AV1}$-$T_{AV8}$. By virtue of the $K_{TATC}$ map, the intake air temperature-correcting coefficient $K_{TATC}$ is set to a suitable value.

Then at step S105, the change rate $\Delta P_B$ of the intake air pressure $P_B$, hereinafter merely called "the change rate", is calculated by subtracting a value $PB_{n-3}$ detected in the third loop before the present loop from a value $P_{Bn}$ detected in the present loop. The change rate $\Delta P_B$ is applied to setting of constants used for calculating the duty ratio $D_{OUT}$, as hereinafter described in detail, whereby the rate of increase the supercharging pressure is controlled to a desired value.

Next, at step S106, it is determined whether or not the supercharging pressure is in a range in which open loop control is to be effected. This determination is carried out in accordance with a subroutine shown in FIG. 27.

Figure 27:
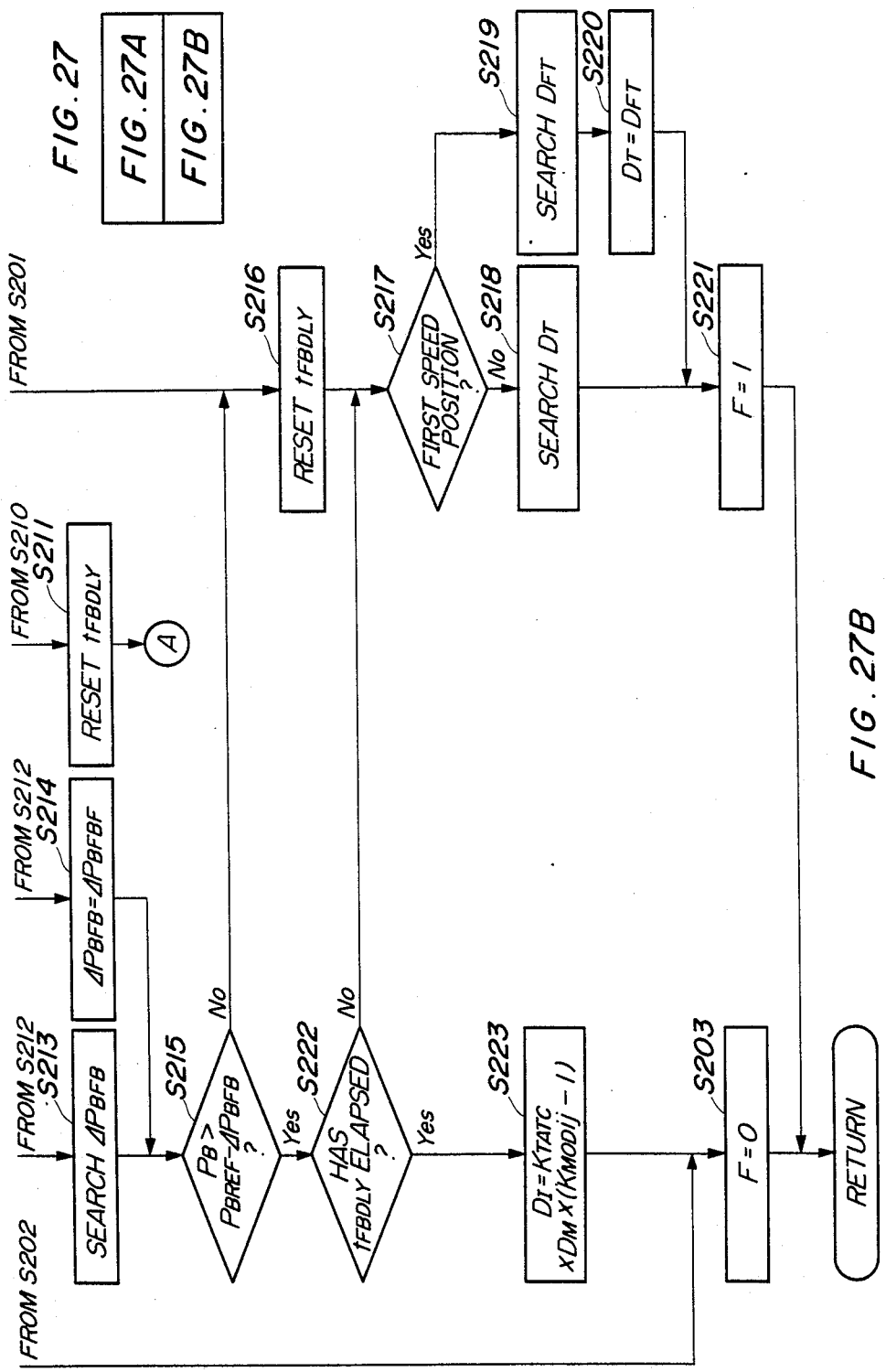
FIG. 27, a composite figure comprising

First, at a step S201 of the FIG. 27 subroutine, it is determined whether or not the throttle valve opening $\theta_{TH}$ is larger than a predetermined value $\theta_{THFB}$ indicating that the throttle valve 74 is almost fully open. If $\theta_{TH} \leq \theta_{THFB}$, that is, if the throttle valve 74 is not almost fully open, it is determined that open loop control should be effected, followed by the program proceeding to step S216 et seq., hereinafter referred to. That is, feedback control is effected only when the throttle valve 74 is almost fully open.

If it is determined at step S201 that $\theta_{TH} > \theta_{THFB}$, it is determined at step S202 whether or not, a flag F set in the last loop at step S203 or S221, hereinafter referred to, is equal to a value of 1, i.e. the open loop control was effected in whether last loop. If feedback control was effected in the last loop, it is judged at step S203 that the feedback control should be continued, and the flag F is set to a value of 0, followed by termination of the program.

Figure 28:
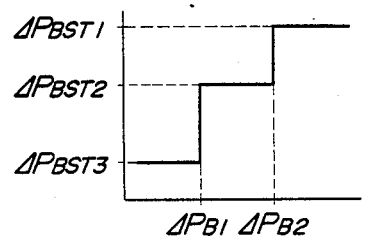
FIG. 28 is a diagram showing a table of a first decremental value $\Delta P_{BSD}$ to be applied when the transmission is in a position other than the first speed position.

If it is determined at step S202 that open loop control was effected, the program proceeds to step S204 in which it is determined whether or not the transmission is in the first speed position. If the transmission is not in the first speed position, a first subtraction value $\Delta P_{BST}$ is obtained at step S205 from a $\Delta P_{BST}$ table applied in a position other than the first speed position, in accordance with the change rate $\Delta P_B$, followed by the program proceeding to a step S207. FIG. 28 shows an example of the $\Delta P_{BST}$ table, in which two predetermined values $\Delta P_{B1}$ and $\Delta P_{B2}$ ($\Delta P_{B1} < \Delta P_{B2}$) are provided as the change rate $\Delta P_{BST}$. The predetermined values $\Delta P_{BST3}$-$\Delta P_{BST1}$ are set such that as $\Delta_{PB}$ is larger, i.e., as the rate of increase the supercharging pressure increases, the first subtraction value $\Delta P_{BST}$ is set to a larger value.

If it is determined at step S204 that transmission is in the first speed position, the first subtraction value $\Delta P_{BST}$ is set to a predetermined value $\Delta P_{BSTF}$ applied in the first speed position. The predetermined value $\Delta P_{BSTF}$ is set at a larger value than the value $\Delta P_{BST}$ obtained from the $\Delta P_{BST}$ map applied in a position other than the first speed position.

Then, it is determined at step S207 whether or not the intake pressure $P_B$ is higher than the difference $P_{BREF}$-$\Delta P_{BST}$ between a desired value $P_{BREF}$ and the first subtraction value $\Delta P_{BST}$ obtained at step S205 or S206. The difference $P_{BREF}$-$\Delta P_{BST}$ is hereinafter referred to as "minimum opening control-terminating pressure". The desired value $P_{BREF}$ is set in accordance with the engine rotational speed $N_E$, the intake air temperature $T_A$, and the gear position of the transmission by the program of FIG. 22, as hereinafter described.

If it is determined at step S207 that the intake pressure $P_B$ is below the minimum opening control-terminating pressure $P_{BREF}$, a proportional control term $D_R$ and an integral control term $D_I$, which are applied to the feedback control, are both set to a value of 0.0, at steps S208, S209, and the duty ratio $D_{OUT}$ is set to 100% at step S210 to make the space area between the movable and stationary vanes 54, 49 a minimum. Thus, when $P_B \leq (B_{REF} - \Delta P_{BST})$, the space area between the movable and stationary vanes is set to the minimum, as at the period between tO-tA in FIG. 36. In this way, the rate of increase supercharging pressure in a low range is made a maximum so that the supercharging pressure is quickly increased to the desired value, thereby enhancing the responsiveness of the supercharging control system.

Figure 1:
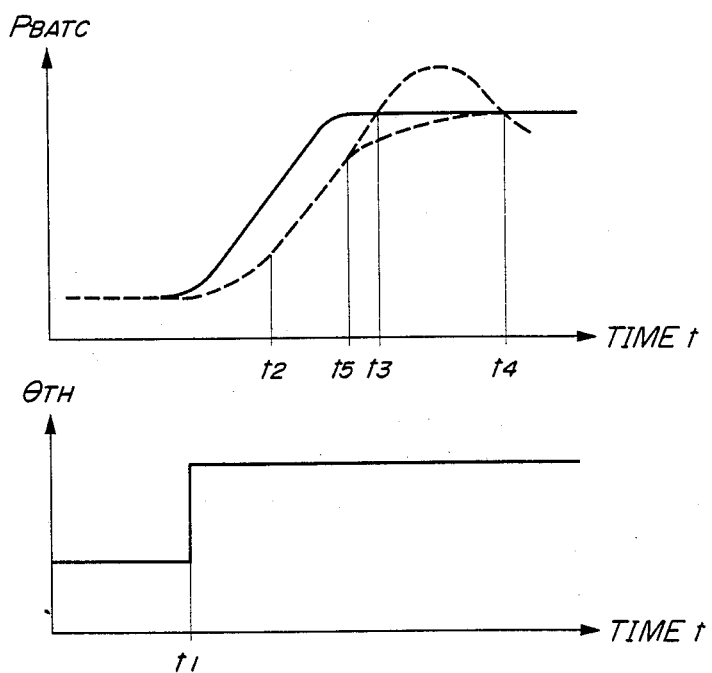
FIG. 1 is a diagram showing supercharging characteristics obtained by the control method of the prior art and that of the present invention.
Figure 36:
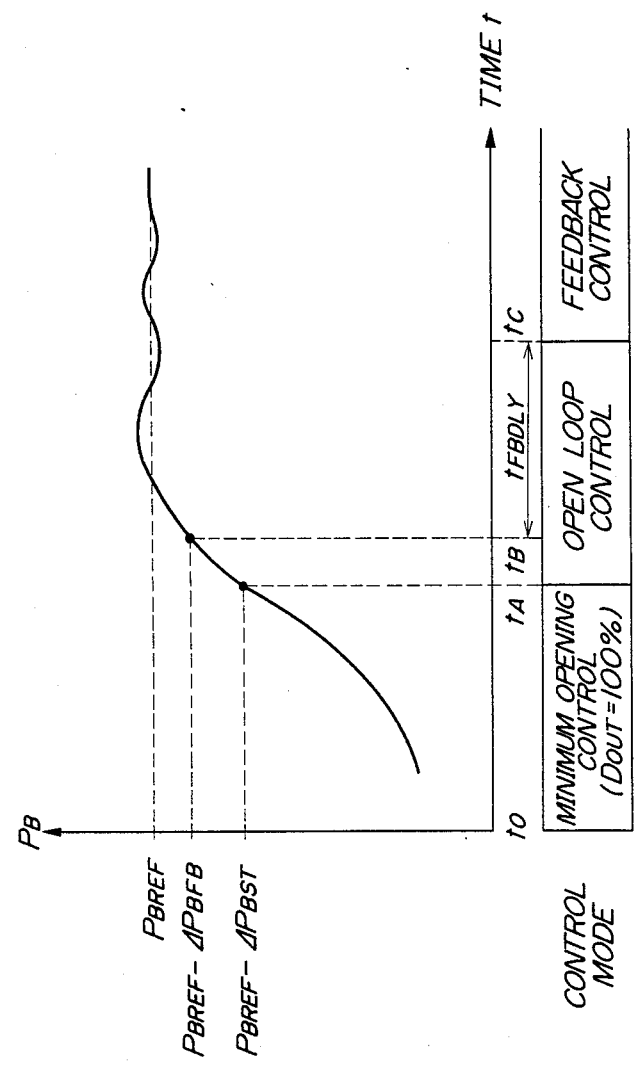
FIG. 36 is a diagram showing the relationship between the intake pressure $P_B$ and the supercharging pressure control.

Further, since the minimum opening control-terminating pressure is set to a value lower than the desired supercharging pressure $P_{BREF}$ by the first subtraction term $\Delta P_{BST}$, overboost in the supercharging pressure can be positively prevented, and hence the accelerability of the engine can be enhanced, as indicated by the solid lines in FIG. 36 and FIG. 1.

Also, since the first subtraction term $\Delta P_{BST}$ is set to a larger value as the rate of increase the supercharging pressure increases, as shown in FIG. 28, the minimum opening control-terminating pressure $(P_{BREF} - \Delta P_{BST})$ is set to a lower value as the rate of increase the supercharging pressure is larger; so that the minimum opening control can be terminated with appropriate timing in response to the actual rate of rise of the supercharging pressure, thereby further enhancing the accelerability of the engine.

Still further, when the transmission is in the first speed position, or when the intake air temperature $T_A$ is low, the rate of increase the supercharging pressure tends to be high. Therefore, according to the invention, when the transmission is in the first speed position, the first subtraction term $\Delta P_{BST}$ is set to a larger predetermined value for the first speed position. On the other hand, when the intake air temperature $T_A$ is low, the desired supercharging pressure $P_{BREF}$ is set to a lower value as the temperature $T_A$ is lower. By virtue of these control techniques, the minimum opening control-terminating pressure $(P_{BREF} - \Delta P_{BST})$ can be set to a more appropriate value in dependence on the gear position or the intake air temperature $T_A$, whereby the accelerability of the engine is further enhanced.

Next, at step S211, a $t_{FBDLY}$ timer for delaying the feedback control is reset, and then the program proceeds to step S118 in FIG. 22 to supply the control valve 69 with a driving signal corresponding to the determined duty ratio $D_{OUT}$, followed by termination of the program of FIG. 22.

Referring again to FIG. 27, if at step S207 the intake pressure PB is higher than the minimum opening control-terminating pressure $(P_{BREF} - \Delta P_{BST})$, it is determined whether or not the transmission is in the first speed position, at step S212. If the transmission is in a position other than the first speed position, a second subtraction value $\Delta P_{BFB}$ is determined from a $\Delta P_{BFB}$ table applied in a position other than the first speed position, in accordance with the change rate $\Delta P_B$; and then the program proceeds to step S215, hereinafter described.

Figure 29:
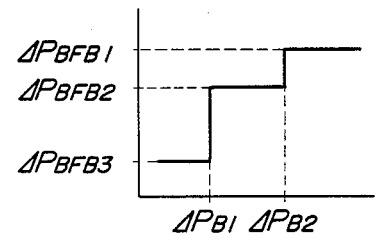
FIG. 29 is a diagram showing a table of a second decremental value $\Delta P_{BFB}$ to be applied when the transmission is in a position other than the first speed position.

FIG. 29 shows an example of the $\Delta P_{BFB}$ table, in which, just like the table of FIG. 28, predetermined values $\Delta P_{BFEB3} - \Delta P_{BFB1}$ are provided $(\Delta P_{BFB3} < \Delta P_{BFB2} < \Delta P_{BFB1})$; which are set such that as the change rate $\Delta P_B$ increases, the second subtraction value $\Delta P_{BFB}$ is set to a larger value.

If it is determined at step S212 that the transmission is in the first speed position, the second subtraction value $\Delta PBFB$ is set to a predetermined value $\Delta P_{BFBF}$ for the first speed position, at step S214; and then the program proceeds to step S215. The predetermined value $\Delta P_{BFBF}$ is set at a value larger than $\Delta P_{BFBF}$ applied in a position other than the first speed position, determined at step S213.

At the next step S215, it is determined whether or not the intake pressure $P_B$ is higher than the difference $(P_{BREF} - \Delta P_{BFB})$ between the desired value PBREF and the second subtraction value $\Delta P_{BFB}$ obtained at step S213 or S214. The difference $(P_{BREF} - \Delta P_{BFB})$ is hereinafter referred to as "feedback control-starting pressure". If the intake pressure PB is lower than the feedback control-starting pressure $(P_{BREF} - \Delta P_{BFB})$, it is judged that feedback control should not be effected, and then the program proceeds to step S216 et seq. If the answer at step S215 is no, that is, if $(P_{BREF} - \Delta P_{BST}) < PB \leq (P_{BREF} - \Delta P_{BFB})$, open loop control is effected during the period between tA-tB in FIG. 36.

At step S216, the $t_{FBDLY}$ timer is reset, as in step S211; and at step S217, it is determined whether or not the transmission is in the first speed position. If the answer is no, a subtraction term $D_T$ is determined from a $D_T$ table applied in a position other than the first speed position, at step S218; followed by the program proceeding to step S221, hereinafter referred to.

Figure 30:
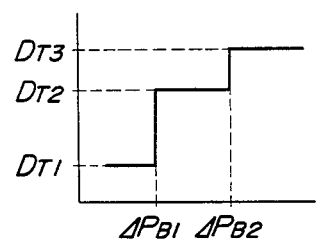
FIG. 30 is a diagram showing a table of a subtraction term $D_T$ to be applied when the transmission is in a position other than the first speed position.

FIG. 30 shows an example of the $D_T$ table, in which predetermined values $D_{T1} - D_{T3}$ $(D_{T1} < D_{T2} < D_{T3})$ are set such that as the change rate $\Delta P_B$ increases, the subtraction value $D_T$ is set to a larger value, just like in the map of FIG. 28.

Figure 31:
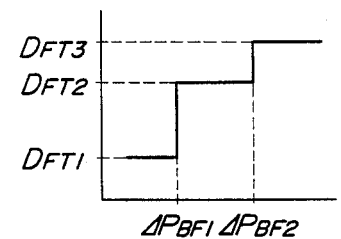
FIG. 31 is a diagram showing a table of a subtraction term $D_{FT}$ to be applied when the transmission is in the first speed position.

If at step S217 it is determined that the transmission is in the first speed position, a subtraction term $D_{FT}$ is determined from a $D_{FT}$ table for the first speed position in accordance with the change rate $\Delta P_B$, at step S219. FIG. 31 shows an example of the $D_{FT}$ table, in which two predetermined values $\Delta P_{BF1}$ and $\Delta P_{BF2}$ $(\Delta P_{BF2} > \Delta P_{BF1})$ are provided as the change rate $\Delta P_B$, and predetermined subtraction values $D_{FT1} - D_{FT3}$ $(D_{FT1} < D_{FT2} < D_{FT3})$ are set such that as the change rate $\Delta P_B$ increases, the subtraction term $D_{FT}$ is set to a larger value. These predetermined values $D_{FT1} - D_{FT3}$ are set at larger values than respective corresponding values $D_{T1} - D_{T3}$ of FIG. 30 at the same change rate $\Delta P_B$.

Then the subtraction term $D_T$ is set to the determined value $D_{FT}$ at step S220, and the flag F is set to 1 to indicate that open loop control should be executed, at step S221, followed by termination of the program.

If at step S215 it is determined that the intake pressure $P_B$ is higher than the feedback control-starting pressure $(P_{BREF} - \Delta P_{BFB})$, it is determined at step S222 whether or not a predetermined period of time $t_{FBDLY}$ has elapsed after the $t_{FBDLY}$ timer was reset at the step S211 or S216. If the predetermined time period $t_{FBDL}$ has not elapsed yet, the program proceeds to step S217 wherein open loop control is executed; while if the time period $t_{FBDLY}$ has elapsed, it is judged that feedback control should be executed, and then the program proceeds to step S223. In this way, even when the intake pressure $P_B$ exceeds the feedback control-starting pressure $(P_{BREF} - \Delta P_{BFB})$, feedback control is not executed immediately, but open loop control is executed until the predetermined time period $t_{FBDLY}$ elapses, as the period between tB-tC in FIG. 36. Only after the lapse of $t_{FBDLY}$, is feedback control started, as at tC in FIG. 36.

At step S223, an initial value of the integral control term $D_T$ is calculated by the following equation:

$$D_I = K_{TATC} \times D_M \times (K_{MODij} - 1)$$

where $K_{MODij}$ is a learned correction coefficient (learned value) calculated during feedback control in accordance with the program of FIG. 22, as hereinafter described.

Then the program proceeds to step S203 to set the flag F to 0 to indicate that feedback control should be executed.

Referring again to FIG. 22, at step S107 following step S106, it is determined whether or not the flag F has been set to 1 in the subroutine of FIG. 27. If the flag F has been set to 1; that is, if feedback control should be started, the desired value $P_{BREF}$ is determined from a $P_{BREF}$ map in accordance with the engine rotational speed $N_E$ and the intake air temperature $T_A$, at step S108. FIG. 32 shows an example of the $P_{BREF}$ table, in which predetermined values $N_{V1}$-$N_{V20}$ of the engine rotational speed $N_E$ and predetermined values $T_{AV1}$-$T_{AV8}$ of the intake air temperature $T_A$ are provided and set in just the same manner as the $K_{TATC}$ map mentioned above. By the use of the $P_{BREF}$ map, according to which the desired value $P_{BREF}$ is set to a higher value as the intake air temperature $T_A$ decreases, the desired value $P_{BREF}$ can be set to appropriate values to operating conditions of the engine.

Then, at step S109 it is determined whether or not the transmission is in the first speed position. If the answer is yes, at step S110 a predetermined value $P_{BREFF}$ is subtracted from the desired value $P_{BREF}$ determined at step S108, to set the desired value $P_{BREF}$, followed by the program proceeding to step S111. On the other hand, if the answer is no, the program jumps from step S109 to the step S111. In this way, the desired value $P_{BREF}$ is set to a lower value in the first speed position than in a position other than the first speed position.

By so setting the desired value $P_{BREF}$, when the transmission is in the first speed position, the supercharging pressure is controlled to a smaller value than a value assumed in another gear position, during a steady state of the supercharging pressure; so that torque applied to the transmission gear is made small, thereby enhancing the durability of the transmission; whereas in another gear position the supercharging pressure in steady state can be controlled to a desired high value.

At step S111, the difference $\Delta P_{BD}$ ($=P_{BREF}-P_B$) between the desired value $P_{BREF}$ and the actual intake pressure $P_B$ is calculated, and then it is determined at step S112 whether or not the absolute pressure $|\Delta P_B|$ of the determined difference $\Delta P_{BD}$ is larger than a predetermined value $G_{PB}$ (e.g. 20 mmHg). The predetermined value $G_{PB}$ is a value defining the insensitive pressure width.

Figure 33:
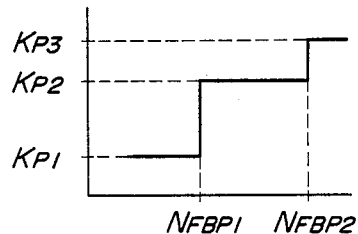
FIG. 33 is a diagram showing a table of a constant $K_P$ for a proportional control term $K_P$.
Figure 34:
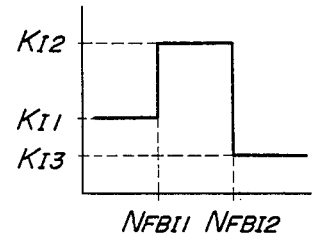
FIG. 34 is a diagram showing a table of a constant $K_I$ for an integral control term $K_I$.

If $\Delta P_{BD} \geq G_{PB}$, respective constants $K_P$ and $K_I$ of the proportional control term $D_P$ and the integral control term $D_I$ are read, respectively, from a $K_P$ table and a $K_I$ table, in accordance with the engine rotational speed N, at step S113. FIG. 33 and FIG. 34 show these tables, respectively. In the $K_P$ table, two predetermined values $N_{FBP1}$ and $N_{FBP2}$ ($N_{FBP2} > N_{FBP1}$) of the engine rotational speed $N_E$ are provided, and predetermined values $K_{P1}$-$K_{P3}$ ($K_{P1} < K_{P2} < K_{P3}$) of the constant $K_P$ are provided, which correspond, respectively, to $N_E < N_{FBP1}$, $N_{FBP1} \leq N_E < N_{FBP2}$, and $N_E \geq N_{FBP2}$. On the other hand, in the $K_I$ table, two predetermined values $N_{FBI1}$ and $N_{FBI2}$ of the engine rotational speed $N_E$ are provided, and predetermined values $K_{I1}$-$K_{I3}$ ($K_{I3} < K_{I1} < K_{I2}$) are provided, which correspond, respectively, to $N_E < N_{FBI1}$, $N_{FBI1} \leq N_E < N_{FBI2}$, and $N_E \geq N_{FBI2}$.

Then the proportional control term $D_P$ is set to the product $K_P \times \Delta P_{BD}$ of the constant $K_P$ and the difference $\Delta P_{BD}$, at step S114, and the integral control term $D_I$ is set to the sum ($=D_I + K_I \times \Delta P_{BD}$) of the integral control term $D_I$ obtained in the last loop and the product $K_I \times \Delta P_{BD}$, at step S115.

The proportional control term $D_P$ and the integral control term $D_I$ thus determined are substituted into the following equation to calculate the duty ratio $D_{OUT}$ applied during feedback control:

$$D_{OUT} = D_M \times K_{TATC} + D_R + D_I$$

Then the calculated duty ratio $D_{OUT}$ is subjected to limit checking to adjust the same within a predetermined range, at step S117. A driving signal corresponding to the duty ratio $D_{OUT}$ is supplied to the electromagnetic control valve 69, at step S118, followed by termination of the program.

When $|\Delta P_{BD}| < G_{PB}$ at the step S112 and hence the actual intake pressure P is substantially equal to the desired value $P_{BREF}$, the proportional control term D is set to 0.0, and the integral control term D is set to a value thereof obtained in the last loop, at respective steps S119 and S120.

Then it is determined at step S121 whether or not the transmission is in the first speed position. When the answer is yes, a coefficient $K_R$ is calculated by the following equation at step S122:

$$K_R = (K_{TATC} \times D_M + D_I)/(K_{TATC} \times D_M)$$

where the coefficient $K_R$ represents an amount of deviation of the supercharging pressure from the desired value due to variations caused during the mass production of the engine and the control system and/or due to aging.

Then at step S123 the cofficient $K_R$ obtained as described above is applied to calculation of the learned correction coefficient $K_{MODij}$ by the use of the following equation:

$$K_{MODij} = C_{MOD}/A \times K_R + (A - C_{MOD})/A \times K_{MODij}$$

where $K_{MODij}$ of the second term on the right side is a value of $K_{MODij}$ obtained in the last loop and is read from a $K_{MODij}$ map, hereinafter described, in accordance with the engine rotational speed $N_E$ and the intake air temperature $T_A$. A is a constant, and $C_{MOD}$ is a variable which is set to a suitable value experimentally selected from a value within the range 1-A.

The ratio of $K_R$ to $K_{MODij}$ varies depending upon the value of the variable $C_{MOD}$. Therefore, by setting the value of $C_{MOD}$ to a value falling within the range of 1-A according to characteristics of the supercharging pressure control system, the engine, etc., an optimal value of $K_{MODij}$ can be calculated.

Then the learned correction coefficient $K_{MODij}$ calculated as above is stored into the $K_{MODij}$ map which is provided within a back-up RAM of the control unit C, at step S124; and the program proceeds to step S116 et seq. and is then ended. FIG. 35 shows an example of the $K_{MODij}$ map, in which, like the $K_{TATC}$ map of FIG. 26 and the $P_{BREF}$ map of FIG. 32, the $K_{MODij}$ value is classified into a plurality of predetermined values in accordance with the engine rotational speed $N_E$ and the intake air temperature $T_A$.

The value of $K_{MODij}$ is calculated and the calculated value is stored in each of a plurality of regions defined by $N_E$ and $T_A$.

When it is determined that the flag F is equal to 1, that is, when open loop control should be executed according to the subroutine of FIG. 27, a value of the learned correction coefficient $K_{MODij}$ is read from the $K_{MODij}$ map in accordance with the engine rotational speed $N_E$ and the intake air temperature $T_A$, at step S125, and the proportional control term $D_P$ and the integral control term $D_I$ are both set to 0.0, at steps S126 and S129.

Then the duty ratio $D_{OUT}$ applied during open loop control is calculated by the following equation:

$$D_{OUT} = K_{TATC} \times K_{MODij} \times (D_M - D_T)$$

where $D_T$ is the subtraction term set at step S218 or S220 of the subroutine of FIG. 27.

Then the duty ratio $D_{OUT}$ calculated as above is is subjected to limit checking to be adjusted within a range from 0% to 100% at step S129. This is followed by execution of step S118 and termination of the program.

As stated above, the learned correction coefficient $K_{MODij}$ is calculated and stored during feedback control in each of the predetermined regions in which the engine rotational speed $N_E$ and the intake air temperature $T_A$ fall; while during open loop control the coefficient $K_{MODij}$ calculated during feedback control is applied in each of the predetermined regions in which the engine rotational speed $N_E$ and the intake air temperature $T_A$ fall. As a result, deviation of the supercharging pressure from the desired value can be accurately corrected in response to these engine operating parameters during open loop control.

If the transmission is determined to be in the first speed position at step S121, the program skips over steps S122–S124 to step S116 to inhibit the calculation of the learned correction coefficient $K_{MODij}$. As stated before, when the transmission is in the first speed position, the desired supercharging pressure value $P_{BREF}$ is set to a value smaller by the predetermined value $P_{BREFF}$ than when the transmission is in another position, at step S210. As a result, the supercharging pressure can be different between when the transmission is in the first speed position from when it is in another position, even if the engine rotational speed $N_E$ and the intake air temperature $T_A$ fall in the same region. Therefore, when the transmission is in the first speed position, the calculation of $K_{MODij}$ is inhibited as mentioned above, so as to prevent the $K_{MODij}$ value from deviating from a proper value, thereby more accurately controlling the supercharging pressure during open loop control.

According to the method of the invention, the following results can be provided:

(i) Control for increasing the supercharging pressure to a maximum value thereof is effected in direct response to the actual supercharging pressure until a predetermined pressure value lower than the desired value applied for feedback control is reached. Therefore, the rate of rise of supercharging pressure can be increased without occurrence of overboost, resulting in improved accelerability of the engine.

(ii) The above result is more positively obtained since control for increasing the supercharging pressure to the maximum value is terminated in response to the actual rate of rise of the supercharging pressure.

(iii) As a result of the control techniques in (i) and (ii), above control for increasing the supercharging pressure to the maximum value is terminated at an earlier time as the rate of rise of the supercharging pressure increases, as well as in response to the gear position and the intake air temperature (which substantially affect the behavior of the supercharging pressure), whereby the results (i) and (ii) can be further ensured.

Although the embodiments described above are applied to a variable capacity turbocharger which has its capacity varied by means of movable vanes 54 as increase rate-varying means, the method of the invention may also be applied to other types of variable capacity type turbochargers such as a waste-gate type and a supercharging pressure-relief type, as well as to other types of superchargers than the turbocharger.

What is claimed is:

1. A method of controlling supercharging pressure in an internal combustion engine having a supercharger having increase rate-varying means for varying an increase rate of the supercharging pressure, wherein the supercharging pressure is controlled to a desired value in response to a difference between an actual value of the supercharging pressure and said desired value, the method comprising the steps of:
   (1) detecting the actual value of the supercharging pressure;
   (2) Comparing the detected actual value of the supercharging pressure with a predetermined value which is lower than said desired value; and
   (3) holding said increase rate-varying means in a position for obtaining the maximum increase rate of the supercharging pressure while the detected actual value of the supercharging pressure is lower than said predetermined value.

2. A method as claimed in claim 1, including the step of detecting an actual increase rate of the supercharging pressure, and wherein said predetermined value of the supercharging pressure is set to a lower value as the detected increase rate of the supercharging pressure is larger.

3. A method as claimed in claim 1, wherein said predetermined value of the supercharging pressure is set to a lower value when a transmission of said engine is in a lower speed position than when said transmission in a higher speed position.

4. A method as claimed in claim 1, including the step of detecting an actual value of temperature of intake air supplied to said engine, and wherein said predetermined value of the supercharging pressure is set to a lower value as the detected actual value of temperature of intake air is lower.

5. A method as claimed in claims 1, 2, 3 or 4, wherein said supercharger has a turbine wheel, and said increase rate-varying means comprises movable vanes arranged at an inlet opening of said turbine inlet opening, said movable vanes being held in a position for obtaining the maximum area of said inlet opening while the detected actual value of the supercharging pressure is lower than said predetermined value.

* * * * *